United States Patent
Kusunoki et al.

(10) Patent No.: US 12,214,313 B2
(45) Date of Patent: Feb. 4, 2025

(54) METHOD FOR RECOVERING CARBON DIOXIDE GAS AND OTHER GASES

(71) Applicant: TOKUYAMA CORPORATION, Shunan (JP)

(72) Inventors: Masao Kusunoki, Shunan (JP); Hiroki Tanaka, Shunan (JP); Yoshimi Tamaki, Shunan (JP); Dai Tsunoda, Shunan (JP)

(73) Assignee: TOKUYAMA CORPORATION, Shunan (JP)

( * ) Notice: Subject to any disclaimer, the term of this patent is extended or adjusted under 35 U.S.C. 154(b) by 546 days.

(21) Appl. No.: 17/613,877

(22) PCT Filed: May 26, 2020

(86) PCT No.: PCT/JP2020/020803
§ 371 (c)(1),
(2) Date: Nov. 23, 2021

(87) PCT Pub. No.: WO2020/241654
PCT Pub. Date: Dec. 3, 2020

(65) Prior Publication Data
US 2022/0234000 A1  Jul. 28, 2022

(30) Foreign Application Priority Data

May 28, 2019 (JP) .................... 2019-099712
Mar. 5, 2020 (JP) .................... 2020-037751

(51) Int. Cl.
*B01D 53/78* (2006.01)
*B01D 53/62* (2006.01)
(Continued)

(52) U.S. Cl.
CPC ............. *B01D 53/78* (2013.01); *B01D 53/62* (2013.01); *B01D 53/75* (2013.01); *B01D 53/94* (2013.01);
(Continued)

(58) Field of Classification Search
CPC ........ B01D 53/78; B01D 53/62; B01D 53/75; B01D 53/94; B01D 2251/606;
(Continued)

(56) References Cited

U.S. PATENT DOCUMENTS 6,174,506 B1   1/2001  Chakravarti et al.
6,592,829 B2   7/2003  Chakravarti et al.
(Continued)

FOREIGN PATENT DOCUMENTS

CN    107428532 A   12/2017
GB       725000 A    3/1955
(Continued)

OTHER PUBLICATIONS

International Search Report for PCT/JP2020/020803 (PCT/ISA/210) mailed on Aug. 11, 2020.
(Continued)

*Primary Examiner* — Stephen Hobson
(74) *Attorney, Agent, or Firm* — Birch, Stewart, Kolasch & Birch, LLP

(57) ABSTRACT

The present invention provides a method including: a gas absorption step of bringing exhaust gas into contact with an aqueous solution containing alkaline carbonate, so that carbon dioxide gas in the exhaust gas is allowed to react therewith, thereby obtaining an aqueous solution containing alkaline bicarbonate; a gas recovery step of recovering a gas containing nitrogen gas and oxygen gas obtained as a result of the gas absorption step; a decomposition step of decomposing at least a part of the alkaline bicarbonate obtained in the gas absorption step into the alkaline carbonate and the carbon dioxide gas; a circulation step of circulating at least a part of the alkaline carbonate obtained in the decomposition step to the gas absorption step; and a carbon dioxide gas recovery step of bringing a gas containing the carbon
(Continued)

dioxide gas obtained as a result of the decomposition step into contact with an aqueous solution, thereby recovering the carbon dioxide gas obtained in the decomposition step.

15 Claims, 2 Drawing Sheets

(51) Int. Cl.
*B01D 53/75* (2006.01)
*B01D 53/94* (2006.01)

(52) U.S. Cl.
CPC .................. *B01D 2251/606* (2013.01); *B01D 2255/1021* (2013.01); *B01D 2256/10* (2013.01); *B01D 2257/504* (2013.01)

(58) Field of Classification Search
CPC ........ B01D 2255/1021; B01D 2256/10; B01D 2257/504; B01D 53/343; B01D 53/8671; B01D 2251/202; B01D 2251/304; B01D 2251/604; B01D 2251/306; B01D 2252/102; B01D 2257/104; B01D 2258/0283; B01D 53/14; B01D 53/96; B01J 23/42; C01B 21/04; C01B 32/50; C01B 21/0494; C01B 2210/0003; C01B 2210/0004; C01B 2210/0045
See application file for complete search history.

(56) References Cited

U.S. PATENT DOCUMENTS

| | | | |
|---|---|---|---|
| 7,727,374 | B2 | 6/2010 | Jones |
| 8,741,244 | B2 | 6/2014 | Jones |
| 11,305,994 | B2 | 4/2022 | Kurosawa et al. |
| 2007/0044658 | A1 | 3/2007 | Rochelle et al. |
| 2010/0218674 | A1 | 9/2010 | Fujikawa et al. |
| 2012/0043501 | A1* | 2/2012 | Rochelle ............ B01D 53/1475 252/184 |
| 2013/0230442 | A1 | 9/2013 | Wei et al. |
| 2013/0315809 | A1 | 11/2013 | Shimamura |
| 2014/0328743 | A1 | 11/2014 | Jones |
| 2015/0241059 | A1 | 8/2015 | Oishi et al. |
| 2015/0246310 | A1* | 9/2015 | Jayaweera .............. C01B 32/50 95/173 |
| 2016/0144295 | A1 | 5/2016 | Zhou et al. |

FOREIGN PATENT DOCUMENTS

| | | |
|---|---|---|
| JP | 2003-53134 A | 2/2003 |
| JP | 3663117 B2 | 6/2005 |
| JP | 2006-521928 A | 9/2006 |
| JP | 2010-202426 A | 9/2010 |
| JP | 4780730 B2 | 9/2011 |
| JP | 2012-166139 A | 9/2012 |
| JP | 2013-544636 A | 12/2013 |
| JP | 2015-536237 A | 12/2015 |
| JP | 2016-159239 A | 9/2016 |
| JP | 2016-188161 A | 11/2016 |
| JP | 2018-501947 A | 1/2018 |
| WO | WO 2014/057567 A1 | 4/2014 |

OTHER PUBLICATIONS

Written Opinion of the International Searching Authority for PCT/JP2020/020803 (PCT/ISA/237) mailed on Aug. 11, 2020.
Chinese Office Action and Search Report dated Jun. 30, 2023 for Application No. 202080036916.6.

* cited by examiner

METHOD FOR RECOVERING CARBON DIOXIDE GAS AND OTHER GASES

TECHNICAL FIELD

The present invention relates to a novel method for separating and recovering carbon dioxide gas as well as nitrogen gas and oxygen gas from exhaust gas. More specifically, the present invention relates to a novel method for efficiently separating and recovering high purity carbon dioxide gas as well as nitrogen gas with high purity with the use of an inexpensive inorganic compound.

BACKGROUND ART

Fossil fuels have long enriched the life of humankind. However, if these fuels are used at this rate, the global environment will evidently be destroyed by the excessive emission of greenhouse gases as typified by carbon dioxide gas. Accordingly, decarbonation (reducing the amount of carbon dioxide gas) has been considered in all parts of the world as a way to tackle this top priority issue that all mankind faces. This challenge has been discussed from various perspectives such as the promotion of energy saving, the widespread use of regenerated energy, and the fixation of carbon dioxide gas. In order to reduce carbon dioxide gas, it is particularly indispensable to provide a method for treating exhaust gas from factories, power plants and the like that produce a large absolute amount of carbon dioxide gas emission. If carbon dioxide gas contained in such exhaust gas can be safely, stably and rationally concentrated, it will be able to be recycled into various carbon products, or usefully recovered and stored using remarkable technology that has received attention in recent years.

In the foregoing circumstances, various measures have been considered to reduce carbon dioxide gas contained in exhaust gas from a variety of factories and power plants.

Specifically, a known method uses amines such as alkanolamine as an absorbent (e.g., see Patent Documents 1 and 2). Since most amines are liquid and well soluble in water, they are effective in absorbing carbon dioxide gas.

However, when an absorbent made only of amines is used, an odor is generated. Moreover, amines may necessitate complicated handling when being removed upon the recovery of carbon dioxide gas. For theses reasons, such a method still needs to be improved to ensure safety and security. Meanwhile, a sealed explosion-proof structure is necessary for improved safety. Such a structure sometimes requires inert gases and the like, which may decrease the efficiency of recovering carbon dioxide gas depending on the type of amines. In order to improve the aforementioned problems, it is necessary to make a costly investment in equipment, for example. In addition, depending on the type of amines to be used, a lot of energy may be consumed for the improvement of stability and for the separation and removal of carbon dioxide gas to be obtained depending on the concentration thereof. Thus, an improvement is also needed in terms of economic efficiency.

Meanwhile, numerous other methods for recovering carbon dioxide gas have also been proposed, in which an inorganic compound such as an aqueous sodium hydroxide solution or an aqueous potassium hydroxide solution is brought into contact with exhaust gas containing carbon dioxide gas so as to produce carbonate, hydrogen carbonate and the like (e.g., see Patent Documents 2 and 3).

Patent Document 2 describes a method for recovering carbon dioxide gas in the form of potassium carbonate and potassium bicarbonate. According to Patent Document 2, carbon dioxide gas is initially recovered as potassium bicarbonate and then recovered from the resultant solution by a stripping process using steam, and potassium carbonate is used circularly. Patent Document 2 describes recovering carbon dioxide gas and hydrogen sulfide gas.

However, since this method uses a steam stripping process to recover carbon dioxide gas, the resultant carbon dioxide gas is likely to contain moisture. Thus, the method has to be improved to recover high purity carbon dioxide gas.

Patent Document 3 describes a method in which an aqueous sodium hydroxide solution and an aqueous sodium carbonate solution are used to absorb carbon dioxide gas therein.

However, the method of Patent Document 3, which is described as an invention including a step of preparing the aqueous sodium hydroxide solution, necessitates a salt electrolysis step, for example. Thus, this method needs to be implemented in a large-scale factory, and leaves room for improvement in process simplification.

PRIOR ART DOCUMENTS

Patent Documents

Patent Document 1: JP 3663117 B2
Patent Document 2: GB 725000 B
Patent Document 3: JP 4780730 B2

SUMMARY OF THE INVENTION

Problems to be Solved by the Invention

In addition, the conventional methods for recovering carbon dioxide gas give no consideration to recovering gas components other than carbon dioxide gas. Namely, none of the aforementioned prior arts describes the handling of gases obtained as a result of separating carbon dioxide gas from exhaust gas.

With the increasing diversification of technology, there has recently been a need to further pursue the reduction and recycling of emissions. For this purpose, it has been required to consider ways to use not only carbon dioxide gas but also gasses obtained as a result of separating the carbon dioxide gas.

Therefore, an object of the present invention is to efficiently recover high purity carbon dioxide gas from exhaust gas under easy control with the use of a safe and inexpensive inorganic compound, and to make effective use of gases obtained as a result of separating the carbon dioxide gas.

Further, the method of the present invention makes effective use of heat generated by reactions during the recovery, separation, purification and the like of the aforementioned gases. The effective use of heat generated in these steps is not described in Patent Documents 2 and 3.

Means for Solving the Problems

In the earnest study of the above-described problems, the present inventors have considered a method that uses inorganic alkali to recover carbon dioxide gas. As a result, it has been found that the use of alkaline carbonate as a starting substance achieves process simplification by reusing the alkaline carbonate after the recovery of high purity carbon dioxide gas. Further, the present inventors have found that this method for separating and recovering carbon dioxide gas with the use of alkaline carbonate also ensures the industrial availability of gasses obtained as a result of separating the carbon dioxide gas, depending on the exhaust gas to be treated. Thus, the present invention has been completed.

In addition to these advantages, it has also been found that when alkaline carbonate is used in combination with amines, particularly preferably ammonia, it is possible to more efficiently absorb carbon dioxide gas, to easily purify the carbon dioxide gas, and to easily make effective use of the amines. Thus, the present invention has been completed.

Namely, the present invention relates to (1) a method for separating exhaust gas containing carbon dioxide gas, nitrogen gas and oxygen gas into the carbon dioxide gas and a gas containing the nitrogen gas and the oxygen gas and respectively recovering the carbon dioxide gas and the gas containing the nitrogen gas and the oxygen gas, including:

- a gas absorption step of bringing the exhaust gas into contact with an aqueous solution containing alkaline carbonate, so that the carbon dioxide gas in the exhaust gas is allowed to react therewith, thereby obtaining an aqueous solution containing alkaline bicarbonate;
- a gas recovery step of recovering the gas containing the nitrogen gas and the oxygen gas obtained as a result of the gas absorption step;
- a decomposition step of decomposing at least a part of the alkaline bicarbonate obtained in the gas absorption step into the alkaline carbonate and the carbon dioxide gas;
- a circulation step of circulating at least a part of the alkaline carbonate obtained in the decomposition step to the gas absorption step; and
- a carbon dioxide gas recovery step of bringing a gas containing the carbon dioxide gas obtained as a result of the decomposition step into contact with an aqueous solution, thereby recovering the carbon dioxide gas obtained in the decomposition step.

Further, the present invention can also be embodied as follows:

(2) the alkaline carbonate is potassium carbonate, and the alkaline bicarbonate is potassium bicarbonate;
(3) the aqueous solution containing the alkaline carbonate in the gas absorption step further contains amines;
(4) the amines are ammonia;
(5) the method further comprises a step of recognizing a composition of the exhaust gas before being subjected to the gas absorption step;
(6) the exhaust gas has a volume ratio of the nitrogen gas to the oxygen gas (nitrogen gas/oxygen gas) of not less than 10/1 and not more than 100/1;
(7) the method further comprises a first purification step of allowing the gas containing the nitrogen gas and the oxygen gas obtained in the gas recovery step to react with hydrogen gas in the presence of a platinum catalyzer, thereby reducing the oxygen gas contained in the gas, wherein heat generated in the first purification step is used to decompose at least a part of the alkaline bicarbonate into the alkaline carbonate and the carbon dioxide gas in the decomposition step; and
(8) the method further includes a second purification step of bringing the gas containing the nitrogen gas and the oxygen gas before being subjected to the first purification step or the gas containing the nitrogen gas and the oxygen gas after being subjected to the first purification step into contact with an aqueous alkali solution.

According to the present invention, it is possible to remove most carbon dioxide gas from exhaust gas with the use of alkaline carbonate. Thus, by recognizing in advance the composition of exhaust gas to be treated, it is possible to predict the composition of a gas to be obtained after separating carbon dioxide gas from the exhaust gas. This facilitates the effective use of the gas obtained as a result of separating carbon dioxide gas. In particular, the embodiments (6), (7) and (8) contribute to obtaining a gas containing high concentration nitrogen gas. Further, the embodiment (7) contributes to making effective use of heat generated during recovery and the like.

Effects of the Invention

According to the present invention, high purity carbon dioxide gas can be efficiently separated from exhaust gas by an inexpensive and safe method. In other words, exhaust gas can be treated effortlessly and easily with the use of an inexpensive material. As long as exhaust gas is prepared, only method steps of the present invention may be performed, or alternatively the method of the present invention may be incorporated into the cycle of a large-scale factory.

In a case where a factory from which exhaust gas is emitted produces alkaline carbonate and/or uses the ammonia soda process, for example, carbon dioxide gas obtained in a carbon dioxide gas recovery step can be used as a raw material gas for the factory. Thus, when the present invention is applied to such a factory, it is possible to thoroughly prevent the emission of carbon dioxide gas to the outside of the factory.

Further, amines can be used in combination with alkaline carbonate for more efficient recovery of carbon dioxide gas. In particular, ammonia may be used as amines because it can be easily separated from carbon dioxide gas by, for example, being brought into contact with an aqueous solution (water). In addition, ammonia is easily available in a factory where the ammonia soda process is used, for example, from a step of producing calcium chloride from calcium hydroxide and ammonium chloride. Separated ammonium can be used not only circularly but also as a raw material for the ammonia soda process.

Further, carbon dioxide gas obtained in the carbon dioxide gas recovery step is of high purity. Thus, if this carbon dioxide gas cannot be supplied to the factory, it can find industrial use as a raw material for an organic compound such as alcohol, a raw material for dry ice, gas for fire extinguishers, and the like. Besides, since the obtained carbon dioxide gas is of high concentration, it can be easily liquefied.

In addition, it is possible in the present invention to obtain a gas containing nitrogen gas and oxygen gas with a reduced amount of carbon dioxide gas.

In particular, when exhaust gas containing carbon dioxide gas is initially brought into contact with an aqueous solution containing potassium carbonate, the resultant aqueous solution is of high concentration as compared with the case of using other aqueous alkaline carbonate solutions. This results in an increase in the rate of carbon dioxide gas recovery (absorption). It is also possible to recover a gas containing oxygen gas and nitrogen gas with high purity. The potassium carbonate can be used circularly.

Further, by adjusting in advance the composition of exhaust gas to be treated, it becomes possible in the present invention to make effective use of a gas obtained as a result of removing carbon dioxide gas from the exhaust gas. The present invention enables carbon dioxide gas to be efficiently separated and recovered. Thus, when exhaust gas to be treated is adjusted such that the volume ratio of nitrogen gas to oxygen gas (nitrogen gas/oxygen gas) is not less than 10/1 and not more than 100/1, a gas obtained in a gas recovery step has a volume ratio of nitrogen gas to oxygen gas (nitrogen gas/oxygen gas) of not less than 10/1 and not more than 100/1. Thus, it is possible to obtain highly concentrated and industrially available gas containing nitrogen gas, such as gas applicable to use as an inert gas, or gas available as a raw material for ammonia. The volume ratio of nitrogen gas to oxygen gas contained in exhaust gas to be treated can be adjusted suitably so as to obtain gas containing nitrogen gas, such as gas applicable to use as an inert gas, or gas available as a raw material for ammonia. In particular, when the volume ratio of nitrogen gas to oxygen gas contained in exhaust gas to be treated is adjusted to not less than 20/1, the resultant gas has a volume ratio of nitrogen gas to oxygen gas of not less than 20/1, and is available also as an explosion-proof gas.

As described above, it is also possible in the present invention to obtain high concentration nitrogen gas. In particular, a first purification step which will be detailed below may be performed to obtain higher concentration nitrogen gas. The resultant nitrogen gas also can be used as a raw material for ceramics, such as nitride like silicon nitride, aluminum nitride, boron nitride or the like. Further, the high concentration nitrogen gas can be obtained and it can be easily liquefied.

In a case where exhaust gas to be treated is adjusted such that the volume ratio of nitrogen gas to oxygen gas (nitrogen gas/oxygen gas) is in a range of 10/1 to 100/1, the resultant gas contains nitrogen gas and oxygen gas as described above. Here, the obtained gas may be subjected to the first purification step, in which the gas is allowed to react with hydrogen gas in the presence of a platinum catalyzer, thereby reducing the oxygen gas contained in this gas. In the first purification step which involves an exothermic reaction, heat is generated. Accordingly, the implementation of the first purification step also helps to decompose alkaline bicarbonate in a decomposition step by effectively using heat generated in this step.

In the present invention, exhaust gas containing a relatively large amount of carbon dioxide gas is initially brought into contact with an aqueous solution (preferably, water) containing alkaline carbonate. This allows the carbon dioxide gas to be absorbed and separated stably at an easily controlled temperature.

Further, in a case where a gas containing nitrogen gas and oxygen gas obtained before or after the first purification step contains carbon dioxide gas, this gas is brought into contact with an aqueous alkali solution, thereby obtaining a gas containing a further reduced amount of carbon dioxide gas. Since the gas containing nitrogen gas and oxygen gas recovered in the gas recovery step contains a reduced amount of carbon dioxide gas as compared with exhaust gas, the reaction conditions can be controlled easily, even if this gas is brought into contact with an aqueous alkali solution.

The present invention relates to a novel method for recovering high concentration gases from exhaust gas. More specifically, the present invention makes it possible to extract high concentration gases (carbon dioxide gas and nitrogen gas) from exhaust gas which has been disposed of and called an environmentally destructive gas, and to recycle these gases as a useful raw material. In this regard, the method of the present invention is novel with a great potential in industry. According to the present invention, it is possible to obtain both high concentration carbon dioxide gas and high concentration nitrogen gas by optimizing the conditions, which is a significant economic advantage.

MODE FOR CARRYING OUT THE INVENTION

Figure 1:
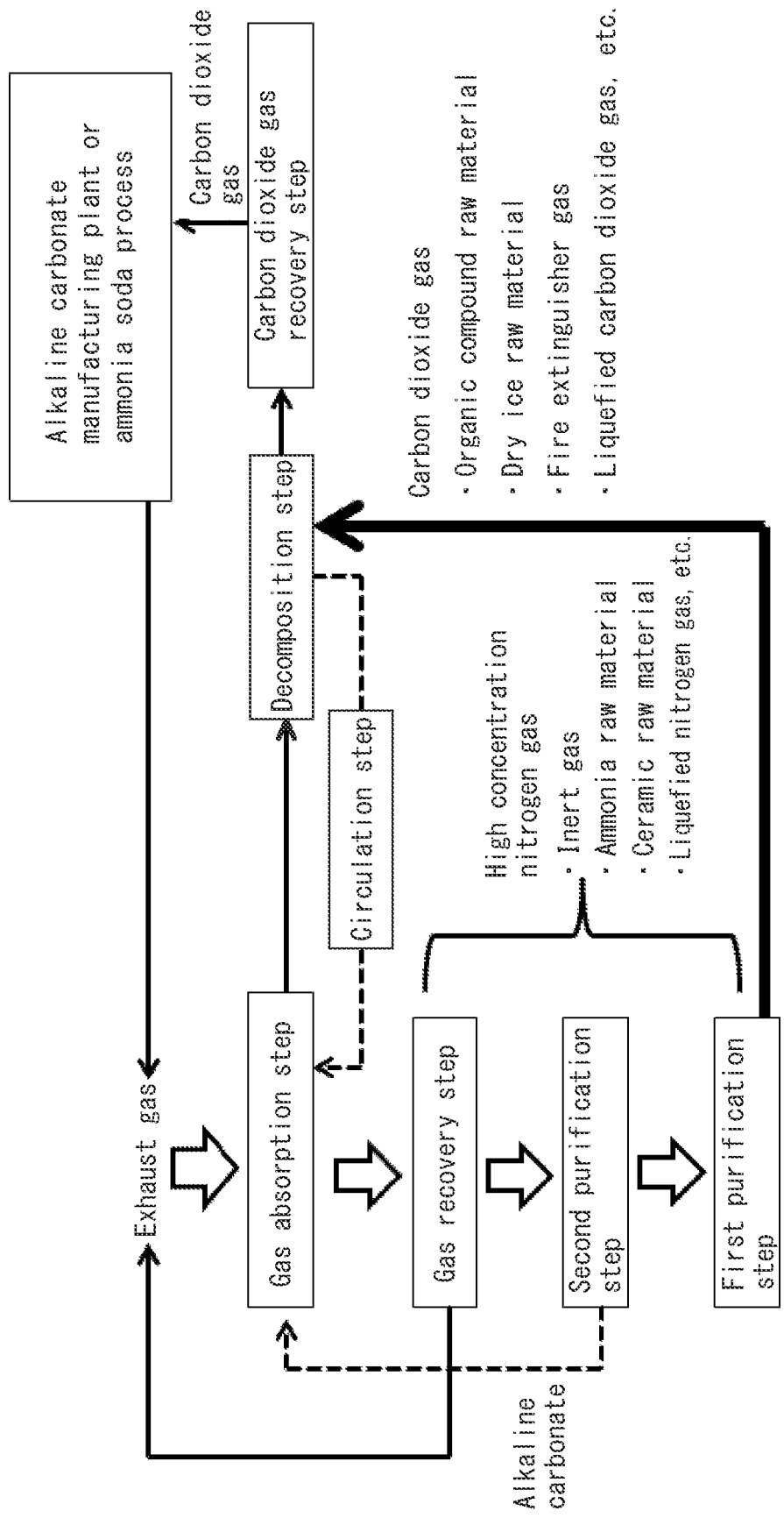
FIG. 1: a flow chart for explaining a preferred embodiment of the present invention.
Figure 2:
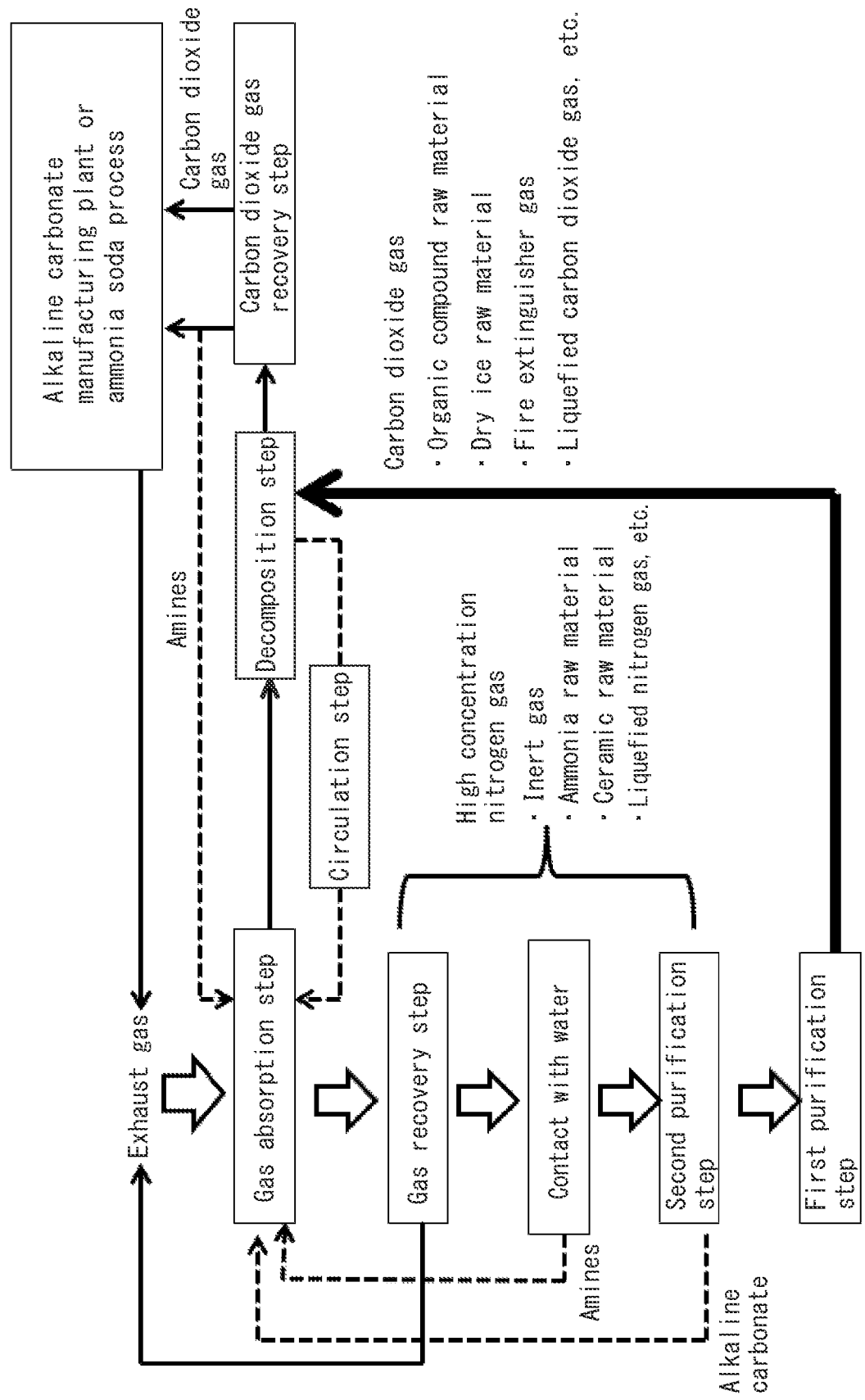
FIG. 2: a flow chart for explaining a preferred embodiment in which amines are used in the present invention.

The present invention relates to a method for separating exhaust gas containing carbon dioxide gas, nitrogen gas and oxygen gas into the carbon dioxide gas and a gas containing the nitrogen gas and the oxygen gas and respectively recovering the carbon dioxide gas and the gas containing the nitrogen gas and the oxygen gas, including:

a gas absorption step of bringing the exhaust gas into contact with an aqueous solution containing alkaline carbonate, so that the carbon dioxide gas in the exhaust gas is allowed to react therewith, thereby obtaining an aqueous solution containing alkaline bicarbonate;

a gas recovery step of recovering the gas containing the nitrogen gas and the oxygen gas obtained as a result of the gas absorption step;

a decomposition step of decomposing at least a part of the alkaline bicarbonate obtained in the gas absorption step into the alkaline carbonate and the carbon dioxide gas;

a circulation step of circulating at least a part of the alkaline carbonate obtained in the decomposition step to the gas absorption step; and a carbon dioxide gas recovery step of bringing a gas containing the carbon dioxide gas obtained as a result of the decomposition step into contact with an aqueous solution, thereby recovering the carbon dioxide gas obtained in the decomposition step.

Hereinafter, the present invention will be sequentially described.

<Exhaust Gas to be Treated>

Exhaust gas to be treated in the present invention is not particularly limited; it may be any gas as long as it contains carbon dioxide gas, nitrogen gas and oxygen gas. Specific examples include exhaust gas emitted from various factories such as a power plant, a boiler, an incinerator, a cement factory, a factory where carbon dioxide gas is used as a raw material (a factory where the ammonia soda process is used, a factory producing alkaline carbonate by a reaction between carbon dioxide gas and alkali hydroxide), and a factory where a combustion reaction is used. In particular, gas emitted from a factory where oxygen gas in the air is used as a combustion supporting gas ends up containing concentrated nitrogen gas. By treating such exhaust gas, it is possible to recover not only high concentration carbon dioxide gas but also high concentration nitrogen gas.

The exhaust gas in the present invention preferably has a volume ratio of nitrogen gas to oxygen gas (nitrogen gas/oxygen gas) in a range of 10/1 to 100/1. Here, the volume ratio represents the volume proportion of nitrogen gas contained in the exhaust gas when the volume proportion of oxygen gas is 1. According to the present invention, only carbon dioxide gas can be highly separated first. Thus, it is possible to obtain, in a gas recovery step, a gas that has a volume ratio of nitrogen gas to oxygen gas (nitrogen gas/oxygen gas) in a range of 10/1 to 100/1 from the exhaust gas satisfying the aforementioned range.

The thus-obtained gas contains nitrogen gas of high concentration. Thus, the gas obtained in the gas recovery step is applicable to use as an inert gas or available as a raw material for ammonia, for example. Further, when the exhaust gas to be treated contains a higher proportion of nitrogen gas, the resultant gas can be used also as an explosion-proof gas, though depending on the balance with other impurity gases. For example, when the exhaust gas to be treated has a volume ratio of nitrogen gas to oxygen gas (nitrogen gas/oxygen gas) of not less than 20/1, the resultant gas has a volume ratio of nitrogen gas to oxygen gas of not less than 20/1, and is available also as an explosion-proof gas.

In light of the above, the exhaust gas is preferably subjected to a step of recognizing its composition, prior to a gas absorption step which will be detailed later. When the composition of the exhaust gas to be treated falls outside the range of the volume ratio of nitrogen gas to oxygen gas (nitrogen gas/oxygen gas), i.e., 10/1 to 100/1, the exhaust gas is preferably subjected to an exhaust gas adjustment step in which a gas other than the exhaust gas is mixed so that the aforementioned range is satisfied. The other gas may be any kind of gas emitted in the factory.

As described above, the exhaust gas in the present invention is not particularly limited. Thus, even exhaust gas containing a few percent by volume of carbon dioxide gas can be efficiently treated for the carbon dioxide gas. In particular, considering the generality of gas emitted from the factory or the like, the scale of the gas absorption step to be detailed below, the cyclic usage of alkaline carbonate, and the like, the gas preferably satisfies the following composition range. Specifically, when the sum of carbon dioxide gas, nitrogen gas and oxygen gas is 100 volume %, the carbon dioxide gas, the nitrogen gas and the oxygen gas are contained preferably in amounts of 3 to 49.9 volume %, 50 to 95 volume %, and 0.1 to 10 volume %, respectively, more preferably in amounts of 3 to 45 volume %, 50 to 87 volume %, and 0.1 to 10 volume %, respectively, and still more preferably in amounts of 10 to 45 volume %, 50 to 80 volume %, and 0.1 to 10 volume %, respectively. The method of the present invention is more efficient in treating exhaust gas containing a relatively high concentration of carbon dioxide gas.

The exhaust gas may inevitably contain gases (other gases) other than carbon dioxide gas, nitrogen gas and oxygen gas. In such a case, unless other gases have negative effects on treatments in respective steps to be detailed below, the exhaust gas can be treated as it is with the other gases remaining therein. If any negative effects are expected, other gases may be removed in advance prior to the treatment of the exhaust gas. When the sum of carbon dioxide gas, nitrogen gas and oxygen gas is 100 parts by volume, the exhaust gas can contain other gases in an amount of not more than 10 parts by volume, preferably not more than 5 parts by volume, so as to be treated as it is. The most suitable proportion of other gases is 0 parts by volume. Examples of other gases include carbon monoxide gas.

In the present invention, the exhaust gas is treated in the gas absorption step to be detailed below, so that carbon dioxide gas is absorbed from the exhaust gas. Next, a description will be given of the gas absorption step.

<Gas Absorption Step>

In the gas absorption step of the present invention, the exhaust gas is brought into contact with an aqueous solution containing alkaline carbonate, so that carbon dioxide gas contained in the exhaust gas is allowed to react with the alkaline carbonate to produce alkaline bicarbonate, thereby absorbing the carbon dioxide gas. This reaction is represented by the following formula. This reaction formula applies to the case where the alkali is potassium, for example.

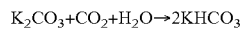

In order to separate and remove carbon dioxide gas contained in a relatively large amount in the exhaust gas, the exhaust gas is initially brought into contact with the aqueous solution containing alkaline carbonate in the gas absorption step of the present invention. When the exhaust gas containing a relatively high proportion of carbon dioxide gas is initially brought into contact with the aqueous solution containing alkaline carbonate, the carbon dioxide gas can be removed relatively stably (constantly) at an easily controlled temperature, for example.

As in the prior art, a larger amount of carbon dioxide gas can be absorbed and separated by initially bringing the exhaust gas into contact with an aqueous solution of alkali hydroxide. However, the use of the aqueous solution of alkali hydroxide rapidly accelerates the reaction and, under some conditions, generates considerable heat. Further, as the reaction proceeds, carbon dioxide gas is absorbed, causing the alkali hydroxide to be converted into alkaline carbonate, and then there is a sudden decrease in the amount of carbon dioxide gas being absorbed. Thus, operation control is sometimes difficult in the prior art where the exhaust gas is initially allowed to react with the aqueous solution of alkali hydroxide.

In the present invention, on the other hand, the exhaust gas is initially brought into contact with the aqueous solution containing alkaline carbonate as described above, which results in easy control as compared with the prior art.

The alkaline carbonate used in the present invention is not particularly limited; it may be a commercialized product. Specific examples include sodium carbonate and potassium carbonate. Among them, potassium carbonate is preferable because it is highly soluble in an aqueous solution and capable of efficiently separating and absorbing carbon dioxide gas. In the case of using sodium carbonate which is less soluble in water, it is preferable to provide a step of producing sodium carbonate by allowing an aqueous sodium hydroxide solution to absorb carbon dioxide gas, which enables a larger amount of carbon dioxide gas to be absorbed. In the case of using potassium carbonate, it is also possible to provide a step of producing potassium carbonate by allowing an aqueous potassium hydroxide solution to absorb carbon dioxide. However, considering that potassium carbonate, which is about three times as soluble in water as sodium carbonate, enables carbon dioxide gas to be separated and absorbed more effectively than sodium carbonate, it is possible, in the case of using potassium carbonate, to start with the step of bringing the exhaust gas into contact with the aqueous potassium carbonate solution.

In the gas absorption step, the exhaust gas is brought into contact with the aqueous solution containing alkaline carbonate that is filled in a packed column. The contact is achieved by the bubbling method in which the exhaust gas is injected into a plate column packed with the aqueous solution from lower and middle stages. The packed column is an absorption column that includes an external cooling device because heat of absorption inhibits the reaction rate.

In a case where the reaction is to proceed continuously, alkaline bicarbonate may be extracted, or alternatively alkaline carbonate may be added in the gas absorption step.

In the gas absorption step, the concentration of alkaline carbonate contained in the aqueous solution is not particularly limited. Considering handleability and the like, the aqueous solution preferably contains alkaline carbonate in a concentration ranging from 10 to 65 mass %. More specifically, in the case of using sodium carbonate, the aqueous solution preferably contains sodium carbonate in a concentration ranging from 10 to 35 mass %. In the case of using potassium carbonate, the aqueous solution preferably contains potassium carbonate in a concentration ranging from 10 to 65 mass %. Needless to say, the aqueous solution may be heated to achieve the aforementioned concentration range.

The aqueous solution containing alkaline carbonate may inevitably contain alkali hydroxide and/or alkaline bicarbonate. The alkali hydroxide is a raw material for producing alkaline carbonate and may be inherently contained in alkaline carbonate. The alkaline bicarbonate may be mixed when alkaline carbonate obtained in a decomposition step to be detailed below is used circularly. Neither the alkali hydroxide nor the alkaline bicarbonate has negative effects on the treatment in the gas absorption step. Considering industrial circulation, it is preferable that decomposition in the decomposition step to be detailed later is carried out at a relatively low temperature for easy utilization of waste heat from the factory or the like. Thus, alkaline bicarbonate may be contained in the aqueous solution containing alkaline carbonate. Accordingly, the aqueous solution containing alkaline carbonate before gas absorption preferably contains alkali hydroxide and/or alkaline bicarbonate in amounts in the following ranges.

Specifically, before gas absorption, alkali hydroxide is contained preferably in an amount of not more than 10 parts by mass, and alkaline bicarbonate is contained preferably in an amount of not more than 10 parts by mass, per 100 parts by mass of alkaline carbonate. More preferably, alkali hydroxide is contained in an amount of not more than 3 parts by mass, and alkaline bicarbonate is contained in an amount of not more than 3 parts by mass. The lower limits of alkali hydroxide and alkaline bicarbonate are both 0 parts by mass.

However, as will be detailed later, in a case where waste heat from the factory is easily available, and decomposition in the decomposition step is carried out at a relatively low temperature of less than 150° C., the aqueous solution containing alkaline carbonate to be circularly used may have the following composition. Namely, the aqueous solution contains alkaline bicarbonate preferably in an amount of not less than 0 parts by mass and not more than 300 parts by mass per 100 parts by mass of alkaline carbonate. Needless to say, the amount of alkaline bicarbonate is preferably 0 parts by mass before cyclic usage (in the initial state). For cyclic usage, the aqueous solution contains alkaline bicarbonate preferably in an amount of not less than 30 parts by mass and not more than 240 parts by mass, more preferably in an amount of not less than 40 parts by mass and not more than 220 parts by mass, and still more preferably in an amount of not less than 50 parts by mass and not more than 200 parts by mass, per 100 parts by mass of alkaline carbonate. This enables effective use of waste heat and achieves improved efficiency (time reduction, etc.) during cyclic usage. The aqueous solution containing alkaline carbonate supplied from a circulation step to be detailed later can be used as it is when satisfying the aforementioned range, or alternatively it may be added with alkaline carbonate and/or alkaline bicarbonate if necessary.

In the present invention, optimum conditions for bringing the exhaust gas into contact with the aqueous solution containing alkaline carbonate vary with the size and specification of a device, the composition of the exhaust gas, the concentration of alkaline carbonate, and the like. Thus, carbon dioxide gas is allowed to sufficiently react with alkaline carbonate.

The temperature at which the exhaust gas is brought into contact with the aqueous alkaline carbonate solution is not limited particularly; it is preferably in a range of not less than 10° C. and not more than 70° C., more preferably in a range of not less than 20° C. and not more than 60° C., so that carbon dioxide gas can be sufficiently absorbed.

Other conditions for bringing the exhaust gas into contact with the aqueous solution containing alkaline carbonate may be determined as appropriate so that carbon dioxide gas can be sufficiently separated and absorbed.

In the present invention, the aqueous solution containing alkaline carbonate used in the gas absorption step may contain amines. The amines in the present invention include ammonia. Specific examples of the amines include alkanol amine, alkyl amine, and ammonia which have been used conventionally for absorbing carbon dioxide gas. It is presumed that amines used in combination react with carbon dioxide gas, allowing the aqueous solution to absorb the carbon dioxide gas. Further, it is presumed that carbon dioxide gas reacts with water and easily gets ionized, which facilitates the reaction with alkaline carbonate. As a result, it is expected to become possible to absorb carbon dioxide gas in a short time.

In order to achieve these effects, it is preferable to use ammonia among the aforementioned amines, considering separation from carbon dioxide gas, availability and the like. In particular, in a factory where the ammonia soda process is used, ammonia is easily available and ensured to be recovered. When alkaline carbonate is converted into alkaline bicarbonate (for gas absorption), ammonia may be present as ammonium carbonate and/or ammonium bicarbonate. These compounds are separated (decomposed) into carbon dioxide gas and ammonia when the alkaline bicarbonate is decomposed; thus they have no negative effects.

In the present invention, the use of amines enables efficient absorption of carbon dioxide gas. For simple operation and easy removal, amines are contained preferably in an amount in the following range. Namely, before gas absorption, the aqueous solution containing alkaline carbonate contains amines preferably in an amount of not less than 0.001 mol and not more than 1 mol, more preferably in an amount of not less than 0.005 mol and not more than 0.8 mol, and still more preferably in an amount of not less than 0.01 mol and not more than 0.5 mol, per mol of the alkaline carbonate. A higher concentration of amines tends to accelerate the absorption of carbon dioxide gas. However, an excessively high concentration of amines may make a post treatment complicated and cause an odor problem. On this account, amines are preferably ammonia because it is easily removable, available, recoverable and recyclable. As mentioned above, ammonia is of great use particularly in a factory where the ammonia soda process is used.

Amines can be used by being blended in the aqueous solution containing alkaline carbonate each time. Further, in a carbon dioxide gas recovery step to be detailed below, amines brought into contact with water are dissolved therein, and the resultant water containing the amines may be mixed with the aqueous solution containing alkaline carbonate to be used circularly. In the gas recovery step to be detailed below, when amines are recovered along with other gases, the gas treated in the gas absorption step may be brought into contact with water, so that the amines are introduced into the water. Needless to say, the water containing the amines also can be used circularly.

Also in the case of using amines, the temperature is preferably in a range of not less than 10° C. and not more than 70° C., more preferably in a range of not less than 20°

C. and not more than 60° C., so as to allow carbon dioxide gas to be sufficiently absorbed.

In the present invention, the aqueous solution containing alkaline carbonate after gas absorption preferably has the following composition. Namely, preferably not less than 45 mass %, more preferably not less than 60 mass %, and still more preferably not less than 70 mass % of alkaline carbonate contained is converted into alkaline bicarbonate. The upper limit of the most preferable proportion of alkaline carbonate to be converted into alkaline bicarbonate is 100 mass %. However, considering industrial operation and recovery, the upper limit may be 99 mass %. Alkaline carbonate can remain with no negative effects. In the case of using amines, it is also preferable that the proportion of alkaline carbonate converted into alkaline bicarbonate falls within the aforementioned range. In such a case, the amines may remain being amines as amine carbonate and/or amine bicarbonate. For example, ammonia may remain being ammonia as ammonium carbonate and/or ammonium bicarbonate.

<Gas Recovery Step>

In the gas recovery step of the present invention, the gas treated in the gas absorption step, i.e., the gas obtained as a result of bringing the exhaust gas into contact with the aqueous solution containing alkaline carbonate, is recovered. The gas recovery step is not particularly limited; it may be carried out with standard recovery equipment.

As described above, in the case of using amines, the gas recovered in the gas recovery step may contain the amines. In such a case, the gas treated in the gas absorption step may be brought into contact with water, so that the amines can be dissolved in the water and separated. The resultant water containing the amines can be used circularly. In particular, in the case of using ammonia, the resultant water can be used not only circularly but also as a raw material for the ammonia soda process. The treated gas may be brought into contact with water under such conditions that the contained amines are removed sufficiently.

The gas obtained in the gas recovery step contains a reduced amount of carbon dioxide gas. As described above, the exhaust gas having a volume ratio of nitrogen gas to oxygen gas (nitrogen gas/oxygen gas) in a range of 10/1 to 100/1 can be treated into a gas having a volume ratio of nitrogen gas to oxygen gas (nitrogen gas/oxygen gas) in a range of 10/1 to 100/1. In particular, it is preferable to adjust the components of the exhaust gas to be treated such that the volume ratio of nitrogen gas to oxygen gas (nitrogen gas/oxygen gas) is 20/1.

The amount of carbon dioxide gas contained in the gas obtained in the gas recovery step of the present invention is efficiently reduced, though depending on the composition of the gas to be treated. Specifically, this gas can have the following composition: when the sum of carbon dioxide gas, nitrogen gas and oxygen gas is 100 volume %, the carbon dioxide gas, the nitrogen gas and the oxygen gas are contained preferably in amounts of 0 to 30 volume %, 65 to 90 volume %, and 0.1 to 10 volume %, respectively.

Needless to say, the gas obtained in the gas recovery step contains a lower proportion of carbon dioxide gas than the exhaust gas before being treated. In order to further reduce carbon dioxide gas, the gas obtained in the gas recovery step may be used circularly as exhaust gas or as exhaust gas mixed with other exhaust gases to be treated.

The gas containing nitrogen gas and oxygen gas obtained in the gas recovery step can be used for various purposes by adjusting the concentration of the exhaust gas to be treated. In order to increase the purities of the respective components, in particular to increase the concentration of nitrogen gas, and to make effective use of heat, the following first purification step is preferably performed.

<First Purification Step>

The gas recovered in the gas recovery step, which can be used as it is, can be subjected to the following first purification step to reduce oxygen gas contained therein. Needless to say, the first purification step is applicable not only to the gas recovered in the gas recovery step but also to the gas obtained as a result of the gas absorption step directly. Alternatively, the first purification step is also applicable to a gas treated in a second purification step to be detailed later, after the gas recovery step.

In the case of using amines, they are preferably removed from the gas to be treated prior to the first purification step.

The gas recovered in the gas recovery step (which has the same composition as the gas obtained as a result of the gas absorption step) can be used as an inert gas. Thus, it is possible to reduce oxygen gas easily and safely by the following method. Namely, the gas obtained in the gas recovery step is mixed with hydrogen, so that water is produced from oxygen gas and the hydrogen gas with the use of a platinum catalyzer, which also results in high concentration nitrogen gas. The thus-obtained water can be used to reduce impurities contained in the nitrogen gas.

The hydrogen gas to be mixed may be determined as appropriate in accordance with the concentration of oxygen gas contained in the recovered gas. The platinum catalyzer to be used may be any of the catalyzers described in JP 5389753 B2, JP 6430772 B2 and the like, for example.

The first purification step involves an exothermic reaction. Though depending on the amount of oxygen gas contained in the gas to be treated, a large amount of heat is generated. The reaction itself is preferably such that the gas containing nitrogen gas and oxygen gas obtained in the gas recovery step is brought into contact with hydrogen gas at a temperature in a range of 50° C. to 450° C. in the presence of a platinum catalyzer. Accordingly, the first purification step requires cooling. Heat obtained during cooling can be used effectively in the decomposition step to be detailed below.

Other conditions may be determined as appropriate, considering the amount of oxygen gas contained in the gas to be treated and the activity maintenance of the platinum catalyzer. Accordingly, the first purification step may be performed in multiple stages.

The gas thus treated to reduce oxygen gas can be used as it is as high concentration nitrogen gas. Alternatively, the gas treated to reduced oxygen gas can be mixed with other exhaust gases to be treated. The thus-obtained mixed exhaust gas can be adjusted such that the volume ratio of nitrogen gas to oxygen gas (nitrogen gas/oxygen gas) is in a range of 100/1 to 1000/1.

The gas obtained through the first purification step alone contains carbon dioxide gas, nitrogen gas and oxygen gas preferably in amounts of 1 to 35 volume %, 65 to 99 volume %, and 0 to 1 volume %, respectively, when the sum of the carbon dioxide gas, the nitrogen gas and the oxygen gas is 100 volume %.

The gas obtained through the first purification step after being subjected the second purification step contains carbon dioxide gas, nitrogen gas and oxygen gas preferably in amounts of 0 to 1 volume %, 99 to 100 volume %, and 0 to 1 volume %, respectively, when the sum of the carbon dioxide gas, the nitrogen gas and the oxygen gas is 100 volume %.

Such high concentration nitrogen gas can be used not only for the aforementioned purposes but also as a ceramic raw material such as nitride. Further, the high concentration nitrogen gas obtained in the present invention can be easily liquefied, which is an advantage in logistics.

The above-described method of the present invention makes it possible to recover a sufficiently high concentration of nitrogen gas. However, in order to further remove carbon dioxide gas, the gas containing nitrogen gas and oxygen gas obtained in the gas recovery step is preferably subjected to the following second purification step.

The first purification step is applicable not only to the gas obtained in the gas recovery step (gas obtained as a result of the gas absorption step) but also to a gas obtained through the second purification step performed prior to the first purification step. The second purification step will be detailed below.

<Second Purification Step>

In order to further highly remove carbon dioxide gas, the present invention preferably includes the second purification step in which the gas containing nitrogen gas and oxygen gas before being subjected to the first purification step, or the gas containing nitrogen gas and oxygen gas after being subjected to the first purification step (hereinafter, these gases may be simply referred to collectively as "recovery gas") is brought into contact with an aqueous alkali solution. Namely, the recovery gas is preferably brought into contact with an aqueous solution containing alkali hydroxide. The contact can be achieved in the same manner as in the gas absorption step.

In a case where amines are used, and the second purification step is applied to the gas containing nitrogen gas and oxygen gas obtained in the gas recovery step before being subjected to the first purification step, the amines may be removed in advance from the recovery gas by using water, or alternatively the amines may be contained in the recovery gas. For further process simplification, it is preferable that the recovery gas containing the amines is treated as it is.

The alkali hydroxide used in the present invention is preferably sodium hydroxide and/or potassium hydroxide. The concentration of alkali hydroxide in the aqueous solution is preferably 10 to 48 mass %. The temperature at which the recovery gas is brought into contact with the aqueous solution containing alkali hydroxide is preferably in a range of 10° C. to 70° C., more preferably in a range of 20° C. to 60° C.

In the present invention, the recovery gas obtained as a result of separating and removing a certain amount of carbon dioxide gas from the exhaust gas is brought into contact with the aqueous solution containing alkali hydroxide. Namely, due to a reduced concentration of carbon dioxide gas, the reaction between the aqueous solution of alkali hydroxide and carbon dioxide, which is an exothermic reaction that proceeds rapidly, can be controlled easily and safely. The present invention is also different from the prior art in this respect.

In the second purification step, the reaction with alkali hydroxide results in alkaline carbonate, which can be extracted as a product or circulated to the gas absorption step. Alternatively, the alkaline carbonate can be directly allowed to react with carbon dioxide gas, so that alkaline bicarbonate is extracted as a product or treated in the decomposition step to be detailed below. The alkaline carbonate containing amines can also be used circularly.

The gas obtained in the second purification step of the present invention contains an efficiently reduced amount of carbon dioxide gas, though depending on the composition of the gas to be treated. Specifically, the gas with the following composition can be obtained. In the case of treating the gas containing nitrogen gas and oxygen gas obtained through the first purification step, carbon dioxide gas, nitrogen gas and oxygen gas are contained preferably in amounts of 0 to 1 volume %, 99 to 100 volume %, and 0 to 1 volume %, respectively, when the sum of the carbon dioxide gas, the nitrogen gas and the oxygen gas is 100 volume %.

In a case where the second purification step is applied to the gas obtained in the gas recovery step before being subjected to the first purification step, carbon dioxide gas, nitrogen gas and oxygen gas are contained preferably in amounts of 0 to 1 volume %, 90 to 99.5 volume %, and 0.5 to 10 volume %, respectively, when the sum of the carbon dioxide gas, the nitrogen gas and the oxygen gas is 100 volume %.

Needless to say, the gas obtained in the recovery gas purification step contains a lower proportion of carbon dioxide gas than the recovery gas obtained in the gas recovery step.

As described above for the first purification step, either one of the first purification step and the second purification step may be performed. When both the steps are performed, either may be performed first. In order to obtain higher purity nitrogen gas, both the steps are preferably performed.

<Decomposition Step>

Next, a description will be given of the decomposition step.

In the decomposition step of the present invention, at least a part of the alkaline bicarbonate obtained in the gas absorption step is decomposed into alkaline carbonate and carbon dioxide gas. When the alkali is potassium, the reaction is represented by the following reaction formula:

$$2KHCO_3 \rightarrow K_2CO_3 + CO_2 + H_2O.$$

The decomposition step results in a solution (aqueous solution containing alkaline carbonate) obtained as a result of recovering carbon dioxide gas from the alkaline bicarbonate. In the decomposition step, carbon dioxide gas is recovered by heating with waste heat from the factory or the like, while the resultant alkaline carbonate is supplied to the circulation step.

At least a part of the alkaline bicarbonate obtained in the gas absorption step is decomposed in the decomposition step of the present invention. In order to efficiently recover carbon dioxide gas, it is preferable to decompose the entire alkaline bicarbonate obtained in the gas absorption step. However, even if the alkaline bicarbonate is not entirely decomposed, and the remaining alkaline bicarbonate is supplied, along with alkaline carbonate, to the circulation step to be detailed below so as to be subjected to the gas absorption step, no negative effect occurs. Accordingly, the amount of alkaline bicarbonate to be decomposed in the decomposition step is preferably not less than 50 mass %, more preferably not less than 70 mass % of the entire alkaline bicarbonate produced in the gas absorption step. As stated above, it is most suitable that 100 mass % of the alkaline bicarbonate is decomposed.

The alkaline bicarbonate obtained in the gas absorption step may be extracted as a solid, and the thus-obtained solid alkaline bicarbonate can be decomposed in the decomposition step. In the case of decomposing the solid alkaline bicarbonate, a device for use in the decomposition step can be miniaturized. Alternatively, the alkaline bicarbonate to be decomposed may be in a slurry state such that the alkaline bicarbonate is partially dissolved and partially present as a solid. Further alternatively, the alkaline bicarbonate to be decomposed may be an aqueous solution containing alkaline bicarbonate. Among them, the alkaline bicarbonate is preferably in the form of a slurry or an aqueous solution in view of handleability, the recovery rate of carbon dioxide gas, and the like.

In the case of decomposing the alkaline bicarbonate in the form of a slurry or an aqueous solution, the concentration of the alkaline bicarbonate is not particularly limited. In view of handleability and the like, it is preferable to use a slurry or an aqueous solution containing the alkaline bicarbonate in a concentration in a range of 5 to 45 mass %. More specifically, in the case of sodium bicarbonate, it is preferable to use a slurry or an aqueous solution containing sodium bicarbonate in a concentration of 5 to 25 mass %. In the case of potassium bicarbonate, it is preferable to use a slurry or an aqueous solution containing potassium bicarbonate in a concentration of 25 to 45 mass %. Among them, potassium bicarbonate, which has high solubility in water, can be treated sufficiently even if it is contained in a slurry or an aqueous solution in a concentration of 25 to 55 mass %.

The aqueous solution to be decomposed in the present invention is the aqueous solution containing alkaline bicarbonate that is converted from the aqueous solution containing alkaline carbonate in the gas recovery step. Here, preferably not less than 45 mass %, more preferably not less than 60 mass %, and still more preferable not less than 70 mass % of alkaline carbonate contained in the aqueous solution used in the gas recovery step is converted into alkaline bicarbonate. The upper limit of the most preferable proportion of alkaline carbonate to be converted into alkaline bicarbonate is 100 mass %. However, considering industrial operation and recovery, the upper limit may be 99 mass %. Alkaline carbonate can remain with no negative effects. The aforementioned range is preferable also in the case of using amines. In such a case, the amines may remain being amines as amine carbonate and/or amine bicarbonate.

The alkaline bicarbonate to be decomposed may contain alkali hydroxide and/or alkaline carbonate. The alkali hydroxide is derived from a raw material for producing alkaline carbonate. The alkaline carbonate remains unreacted with carbon dioxide gas in the gas absorption step as described above. Neither the alkali hydroxide nor the alkaline carbonate has negative effects on the treatment in the decomposition step. In the decomposition step, these impurities may be contained in the alkaline bicarbonate in the following amounts. Specifically, alkali hydroxide is contained preferably in an amount of not more than 10 parts by mass, more preferably in an amount of not more than 3 parts by mass per 100 parts by mass of the alkaline bicarbonate. The lower limit of alkali hydroxide is 0 parts by mass. On the other hand, alkaline carbonate is contained preferably in an amount of not more than 85 parts by mass, more preferably in an amount of not more than 45 parts by mass, and still more preferably in an amount of not more than 30 parts by mass per 100 parts by mass of the alkaline bicarbonate. The lower limit of alkaline carbonate is 0 parts by mass. In view of industrial operation and recovery, alkaline carbonate is contained preferably in an amount of not less than 1 part by mass per 100 parts by mass of the alkaline bicarbonate. In the case of using amines, they may remain being amines as amine carbonate and/or amine bicarbonate as described above in the alkaline bicarbonate to be decomposed.

In the present invention, in a case where the alkaline bicarbonate in a solid form is decomposed, the solid is heated while being diffused and dispersed, until the temperature in the system reaches a temperature at which the alkaline bicarbonate is decomposed. Alternatively, the alkaline bicarbonate in a slurry state is heated while being stirred, until the temperature at which the alkaline carbonate is decomposed is reached.

The temperature at which the alkaline bicarbonate is decomposed is preferably 50° C. to 200° C., more preferably 100° C. to 180° C., and still more preferably 120° C. to 170° C. The alkaline bicarbonate can be decomposed at a temperature in this range, which facilitates the recovery of carbon dioxide gas and the cyclic usage of alkaline carbonate. Here, the alkaline bicarbonate is decomposed at a temperature preferably in a range of 50° C. to 200° C., more preferably in a range of 100° C. to 180° C. under a specific pressure of 0 to 9 $Kg/cm^2G$.

The heat generated in the first purification step can be used to decompose the alkaline bicarbonate. More specifically, the purified or intermediate gas in the first purification step is heated to a high temperature by the reaction heat, and the heat source is directly supplied to a heat exchanger used in the decomposition step, in which it is recovered as a heat source for decomposing the alkaline bicarbonate.

<Decomposition at High Temperature>

When the decomposition is carried out at a temperature in a range of more than 130° C. and not more than 200° C., preferably not less than 120° C. and not more than 180° C., and more preferably not less than 120° C. and not more than 170° C., the resultant aqueous solution preferably contains alkali hydroxide in an amount of not more than 10 parts by mass and alkaline bicarbonate in an amount of not more than 10 parts by mass per 100 parts by mass of alkaline carbonate. More preferably, alkali hydroxide is contained in an amount of not more than 3 parts by mass, and alkaline bicarbonate is contained in an amount of not more than 3 parts by mass. The lower limits of alkali hydroxide and alkaline bicarbonate are both 0 parts by mass.

<Decomposition at Low Temperature>

Needless to say, the decomposition can be carried out without using the heat from the first purification step. For example, it is possible to use heat from a nearby operating factory or the like, if any. In view of industrial operation and recovery as well as the effective use of waste heat from the factory, the decomposition is preferably carried out at a relatively low temperature. Specifically, the alkaline bicarbonate is decomposed at a temperature preferably in a range of not less than 50° C. and less than 120° C., more preferably in a range of not less than 70° C. and less than 120° C., and still more preferably in a range of not less than 80° C. and not more than 110° C. When the alkaline bicarbonate is decomposed at such a relatively low temperature, the resultant aqueous solution preferably contains alkaline carbonate and alkaline bicarbonate in the following proportion. In other words, the aqueous solution containing alkaline carbonate that is circulated to the gas absorption step in the circulation step may have the following composition. Specifically, alkaline bicarbonate is contained preferably in an amount of not less than 0 parts by mass and less than 300 parts by mass, more preferably in an amount of not less than 30 parts by mass and not more than 240 parts by mass, still more preferably in an amount of not less than 40 parts by mass and not more than 220 parts by mass, and even more preferably in an amount of not less than 50 parts by mass and not more than 200 parts by mass, per 100 parts by mass of alkaline carbonate.

In the case of using amines, a part of the alkaline bicarbonate is decomposed into the amines and carbon dioxide gas in the decomposition step. Thus, the amines can be recovered.

Other conditions for decomposing the alkaline bicarbonate in the present invention may be determined as appropriate so that the alkaline bicarbonate can be decomposed.

According to the present invention, the gas obtained in the decomposition step contains carbon dioxide gas, nitrogen gas and oxygen gas preferably in amounts of 98 to 100 volume %, 0 to 1.5 volume %, and 0 to 0.5 volume %, respectively, most preferably in amounts of 100 volume %, 0 volume %, and 0 volume %, respectively, when the sum of the carbon dioxide gas, the nitrogen gas and the oxygen gas is 100 volume %.

The above-described decomposition step can result in the production of alkaline carbonate and carbon dioxide gas.

<Circulation Step>

Next, a description will be given of the circulation step for allowing the obtained alkaline carbonate to be used circularly.

In the circulation step, the alkaline carbonate obtained in the decomposition step is circulated to the gas absorption step.

The alkaline carbonate to be circulated may be in the form of either a solid, a slurry or an aqueous solution. The alkaline carbonate in a solid state enables the miniaturization of a device. The alkaline carbonate in a slurry or aqueous solution state can facilitate the circulation.

The alkaline carbonate to be circulated to the gas absorption step may contain alkali hydroxide and/or alkaline bicarbonate. The alkali hydroxide seems to be inherently derived from a raw material. The alkaline bicarbonate remains undecomposed in the decomposition step. Neither the alkali hydroxide nor the alkaline bicarbonate has negative effects on the treatment in the gas absorption step. Thus, in the circulation step, the aqueous solution containing the alkaline carbonate, the alkali hydroxide and the alkaline bicarbonate obtained in the decomposition step, as described in the sections of <Decomposition at high temperature> and <Decomposition at low temperature>, may be circulated to the gas absorption step, respectively. In the case of using amines, the aqueous solution containing the amines may be circularly used as it is.

In order for the alkaline carbonate in the gas absorption step to be constant in concentration, it is preferable to adjust the concentration of the alkaline carbonate before it is circulated to the gas absorption step in the circulation step. For this purpose, additional alkaline carbonate or amines can be added, if necessary.

<Carbon Dioxide Gas Recovery Step>

Next, a description will be given of the carbon dioxide gas recovery step.

In the carbon dioxide gas recovery step, the carbon dioxide gas obtained in the decomposition step is recovered. More specifically, a gas containing the carbon dioxide gas obtained as a result of the decomposition step is brought into contact with an aqueous solution, preferably water, followed by the recovery of the carbon dioxide gas.

The carbon dioxide gas obtained as a result of the decomposition step is preferably brought into contact with an aqueous solution before being recovered. In particular, the aqueous solution, which is preferably water, may be, for example, industrial water generally used in the factory. In the present invention, since the aqueous solution containing alkaline carbonate is used in the gas absorption step, the carbon dioxide gas obtained as a result of decomposing the alkaline bicarbonate may be inevitably recovered containing water. In particular, when the alkaline bicarbonate in the decomposition step is in a slurry or aqueous solution state, the resultant carbon dioxide gas is recovered with water. In a conventional technique, a gas component contained in the aqueous solution is recovered by the vapor stripping process. This, however, allows more moisture to be contained in the gas. In contrast, when the gas obtained in the decomposition step (which is composed mainly of carbon dioxide gas) is brought into contact with water, dry carbon dioxide gas can be obtained easily.

In addition, in the case of using amines, they can be easily separated from the gas containing the carbon dioxide gas by bringing the carbon dioxide gas obtained as a result of the decomposition step into contact with an aqueous solution in this step. The amines can be easily separated because they are easily soluble in water as compared with the carbon dioxide gas and the like. The resultant water containing the separated amines can be used circularly.

It is not particularly limited how to bring the gas containing the carbon dioxide gas obtained as a result of the decomposition step into contact with an aqueous solution. Specifically, when carbon dioxide gas containing saturated water vapor is directly mixed with cooling water so that it is cooled, dry carbon dioxide gas is obtained. The temperature of the aqueous solution upon contact is not particularly limited; it is preferably 10° C. to 40° C. Further, the contact is preferably made such that the gas containing the carbon dioxide gas is supplied approximately in an amount of 1000 L/hour to 2000 L/hour, more specifically in an amount of 1600 L/hour, per liter of the aqueous solution.

By adjusting the conditions, the carbon dioxide gas to be obtained in the above-described manner can be controlled to contain moisture in an amount of not more than 10 parts by mass per 100 parts by mass of the carbon dioxide gas. The most suitable amount of moisture is 0 parts by mass.

The gas obtained in the carbon dioxide gas recovery step has the same composition as that obtained in the decomposition step. Namely, carbon dioxide gas, nitrogen gas and oxygen gas are contained preferably in amounts of 98 to 100 volume %, 0 to 1.5 volume %, and 0 to 0.5 volume %, respectively, most preferably 100 volume %, 0 volume %, and 0 volume %, respectively, when the sum of the carbon dioxide gas, the nitrogen gas and the oxygen gas is 100 volume %.

The present invention makes it possible to obtain high purity carbon dioxide gas. The obtained carbon dioxide gas can be used as raw materials for an organic polymer, an alcohol such as methanol or ethanol, as well as dry ice and the like, offering a great deal of potential in industry. Besides, since the carbon dioxide gas obtained in the present invention is of high concentration, it can be easily liquefied, which is an advantage in logistics.

In the present invention, in a case where the factory from which the exhaust gas is emitted has a means for manufacturing a product from carbon dioxide gas, the emission of carbon dioxide gas in the factory can be prevented by circularly using carbon dioxide gas in the following manner. Namely, in the factory that has, for example, a means for producing alkaline carbonate, alkaline bicarbonate (sodium carbonate, sodium bicarbonate, potassium carbonate, potassium bicarbonate) and the like or a production means using the ammonia soda process, the carbon dioxide gas obtained in the carbon dioxide gas recovery step can be used as a raw material for the production means, thereby preventing the emission of the carbon dioxide gas in the factory. Needless to say, any exhaust gas in the factory is applicable, such as exhaust gas emitted from the means for producing alkaline carbonate and/or alkaline bicarbonate, the production means using the ammonia soda process, or other production means.

EXAMPLES

Next, the present invention will be described in detail by way of Examples; however, the present invention is not limited to these Examples. The following Examples and Comparative Examples were evaluated as follows.

Example 1

Gas Absorption Step:

Exhaust gas was adjusted to have a composition such that carbon dioxide gas, nitrogen gas and oxygen gas were contained in amounts of 42.5 volume %, 57 volume %, and 0.5 volume %, respectively, when the sum of the carbon dioxide gas, the nitrogen gas and the oxygen gas was 100 volume %. The thus-prepared exhaust gas was supplied in an amount of 60,000 $cm^3$/hour to an aqueous solution containing potassium carbonate in a concentration of 60 mass %. At this time, the aqueous potassium carbonate solution had a temperature (reaction temperature) of 70° C. and was kept being stirred.

The exhaust gas was supplied for one hour, and the resultant aqueous solution was sent to a decomposition step (first purification step).

Gas Recovery Step:

A gas obtained as a result of bringing the exhaust gas into contact with the aqueous potassium carbonate solution in the gas absorption step was recovered. The gas contained carbon dioxide gas, nitrogen gas and oxygen gas in amounts of 26 volume %, 73.4 volume %, and 0.6 volume %, respectively, when the sum of the carbon dioxide gas, the nitrogen gas and the oxygen gas was 100 volume %.

Second Purification Step:

The gas obtained in the gas recovery step was supplied in an amount of 60,000 $cm^3$/hour to be brought into contact with an aqueous solution (temperature: 40° C.) containing potassium hydroxide in a concentration of 10 mass %.

After brought into contact with the aqueous solution, the gas contained carbon dioxide gas, nitrogen gas and oxygen gas in amounts of 0 volume %, 99.1 volume %, and 0.9 volume %, respectively, when the sum of the carbon dioxide gas, the nitrogen gas and the oxygen gas was 100 volume %.

First Purification Step:

The gas obtained in the second purification step was supplied in an amount of 60,000 $cm^3$/hour to be mixed with hydrogen gas supplied in an amount of 4,200 $cm^3$/hour. They were brought into contact and mixed with each other in the presence of a platinum catalyzer at a temperature of 420° C. A gas obtained as a result of the first purification step contained carbon dioxide gas, nitrogen gas and oxygen gas in amounts of 0 volume %, 99.9 volume %, and 0.1 volume %, respectively, when the sum of the carbon dioxide gas, the nitrogen gas and the oxygen gas was 100 volume %.

Decomposition Step:

Since the first purification step involved an exothermic reaction, the aqueous solution containing potassium bicarbonate obtained in the gas absorption step was used as a cooling medium. Decomposition was carried out along with cooling. The aqueous solution was circulated under pressure such that it has a temperature of 150° C. when being decomposed.

The thus-obtained aqueous solution proved to be an aqueous solution of potassium carbonate. Further, a gas obtained as a result of the decomposition step contained carbon dioxide gas, nitrogen gas and oxygen gas in amounts of 99.4 volume %, 0.5 volume %, and 0.1 volume %, respectively, when the sum of the carbon dioxide gas, the nitrogen gas and the oxygen gas was 100 volume %.

Circulation Step:

The aqueous solution of potassium carbonate obtained in the decomposition step was circulated to the gas absorption step.

Carbon Dioxide Gas Recovery Step:

The gas obtained as a result of the decomposition step was brought into contact with water. The gas finally obtained contained carbon dioxide gas, nitrogen gas and oxygen gas in amounts of 99.4 volume %, 0.5 volume %, and 0.1 volume %, respectively, when the sum of the carbon dioxide gas, the nitrogen gas and the oxygen gas was 100 volume %. This gas contained moisture in an amount of 7.2 parts by mass per 100 parts by mass of the carbon dioxide gas.

Since the obtained gas contains high concentration carbon dioxide gas, it can be efficiently used to produce sodium carbonate and sodium bicarbonate.

Example 2

Gas Absorption Step:

Exhaust gas was adjusted to have a composition such that carbon dioxide gas, nitrogen gas and oxygen gas were contained in amounts of 42.5 volume %, 57 volume %, and 0.5 volume %, respectively, when the sum of the carbon dioxide gas, the nitrogen gas and the oxygen gas was 100 volume %. The thus-prepared exhaust gas was supplied in an amount of 26,000 $cm^3$/hour to an aqueous solution containing potassium carbonate in a concentration of 17.5 mass %. At this time, the aqueous potassium carbonate solution had a temperature of 25° C. and was kept being stirred.

The exhaust gas was supplied for 50 minutes, and the resultant aqueous solution was sent to a decomposition step (first purification step).

Gas Recovery Step:

A gas obtained as a result of bringing the exhaust gas into contact with the aqueous potassium carbonate solution in the gas absorption step was recovered. The gas contained carbon dioxide gas, nitrogen gas and oxygen gas in amounts of 26 volume %, 73.4 volume %, and 0.6 volume %, respectively, when the sum of the carbon dioxide gas, the nitrogen gas and the oxygen gas was 100 volume %. The results were the same as those in Example 1.

Second Purification Step:

The gas obtained in the gas recovery step was supplied in an amount of 60,000 $cm^3$/hour to be brought into contact with an aqueous solution (temperature: 40° C.) containing potassium hydroxide in a concentration of 10 mass %.

After brought into contact with the aqueous solution, the gas contained carbon dioxide gas, nitrogen gas and oxygen gas in amounts of 0 volume %, 99.1 volume %, and 0.9 volume %, respectively, when the sum of the carbon dioxide gas, the nitrogen gas and the oxygen gas was 100 volume %. The results were the same as those in Example 1.

First Purification Step:

The gas obtained in the second purification step was supplied in an amount of 60,000 $cm^3$/hour to be mixed with hydrogen gas supplied in an amount of 4,200 $cm^3$/hour. They were brought into contact with each other in the presence of a platinum catalyzer at a temperature of 420° C. A gas obtained as a result of the first purification step contained carbon dioxide gas, nitrogen gas and oxygen gas in amounts of 0 volume %, 99.9 volume %, and 0.1 volume %, respectively, when the sum of the carbon dioxide gas, the nitrogen gas and the oxygen gas was 100 volume %. The results were the same as those in Example 1.

Decomposition Step:

The aqueous solution obtained in the gas absorption step was heated to 100° C. under ordinary pressure, while kept being stirred.

The thus-obtained aqueous solution proved to contain 10 mass % of potassium carbonate and 10 mass % of potassium bicarbonate. Further, a gas obtained as a result of the decomposition step contained carbon dioxide gas, nitrogen gas and oxygen gas in amounts of 99.4 volume %, 0.5 volume %, and 0.1 volume %, respectively, when the sum of the carbon dioxide gas, the nitrogen gas and the oxygen gas was 100 volume %. The results were the same as those in Example 1.

Circulation Step:

The aqueous solution containing potassium carbonate obtained in the decomposition step was circulated to the gas absorption step.

Carbon Dioxide Gas Recovery Step:

The gas obtained as a result of the decomposition step was brought into contact with water. The gas finally obtained contained carbon dioxide gas, nitrogen gas and oxygen gas in amounts of 99.4 volume %, 0.5 volume %, and 0.1 volume %, respectively, when the sum of the carbon dioxide gas, the nitrogen gas and the oxygen gas was 100 volume %. This gas contained moisture in an amount of 7.2 parts by mass per 100 parts by mass of the carbon dioxide gas. The results were the same as those in Example 1.

Example 3

Gas Absorption Step:

Exhaust gas was adjusted to have a composition such that carbon dioxide gas, nitrogen gas and oxygen gas were contained in amounts of 42.5 volume %, 57 volume %, and 0.5 volume %, respectively, when the sum of the carbon dioxide gas, the nitrogen gas and the oxygen gas was 100 volume %. The thus-prepared exhaust gas was supplied in an amount of 26,000 $cm^3$/hour to an aqueous solution containing 10 mass % of potassium carbonate and 10 mass % of potassium bicarbonate. At this time, the aqueous solution had a temperature of 25° C. and was kept being stirred.

The exhaust gas was supplied for 30 minutes, and the resultant aqueous solution was sent to a decomposition step.

Gas Recovery Step:

A gas obtained as a result of bringing the exhaust gas into contact with the aqueous solution containing potassium carbonate in the gas absorption step was recovered. The gas contained carbon dioxide gas, nitrogen gas and oxygen gas in amounts of 26 volume %, 73.4 volume %, and 0.6 volume %, respectively, when the sum of the carbon dioxide gas, the nitrogen gas and the oxygen gas was 100 volume %. The results were the same as those in Example 1.

Second Purification Step:

The gas obtained in the gas recovery step was supplied in an amount of 60,000 $cm^3$/hour to be brought into contact with an aqueous solution (temperature: 40° C.) containing potassium hydroxide in a concentration of 10 mass %.

After brought into contact with the aqueous solution, the gas contained carbon dioxide gas, nitrogen gas and oxygen gas in amounts of 0 volume %, 99.1 volume %, and 0.9 volume %, respectively, when the sum of the carbon dioxide gas, the nitrogen gas and the oxygen gas was 100 volume %. The results were the same as those in Example 1.

First Purification Step:

The gas obtained in the second purification step was supplied in an amount of 60,000 $cm^3$/hour to be mixed with hydrogen gas supplied in an amount of 4,200 $cm^3$/hour. They were brought into contact with each other in the presence of a platinum catalyzer at a temperature of 420° C. A gas obtained as a result of the first purification step contained carbon dioxide gas, nitrogen gas and oxygen gas in amounts of 0 volume %, 99.9 volume %, and 0.1 volume %, respectively, when the sum of the carbon dioxide gas, the nitrogen gas and the oxygen gas was 100 volume %. The results were the same as those in Example 1.

Decomposition Step:

The aqueous solution obtained in the gas absorption step was heated to 100° C. under ordinary pressure, while kept being stirred.

The thus-obtained aqueous solution proved to contain 10 mass % of potassium carbonate and 10 mass % of potassium bicarbonate. Further, a gas obtained as a result of the decomposition step contained carbon dioxide gas, nitrogen gas and oxygen gas in amounts of 99.4 volume %, 0.5 volume %, and 0.1 volume %, respectively, when the sum of the carbon dioxide gas, the nitrogen gas and the oxygen gas was 100 volume %. The results were the same as those in Example 1.

Circulation Step:

The aqueous solution containing potassium carbonate obtained in the decomposition step was circulated to the gas absorption step.

Carbon Dioxide Gas Recovery Step:

The gas obtained as a result of the decomposition step was brought into contact with water. The gas finally obtained contained carbon dioxide gas, nitrogen gas and oxygen gas in amounts of 99.4 volume %, 0.5 volume %, and 0.1 volume %, respectively, when the sum of the carbon dioxide gas, the nitrogen gas and the oxygen gas was 100 volume %. This gas contained moisture in an amount of 7.2 parts by mass per 100 parts by mass of the carbon dioxide gas. The results were the same as those in Example 1.

Example 4

Gas Absorption Step:

Exhaust gas was adjusted to have a composition such that carbon dioxide gas, nitrogen gas and oxygen gas were contained in amounts of 42.5 volume %, 57 volume %, and 0.5 volume %, respectively, when the sum of the carbon dioxide gas, the nitrogen gas and the oxygen gas was 100 volume %. The thus-prepared exhaust gas was supplied in an amount of 26,000 $cm^3$/hour to an aqueous solution containing 17.5 mass % of potassium carbonate and 0.2 mass % of ammonia (0.093 mol of ammonia per mol of potassium carbonate). At this time, the aqueous solution had a temperature of 25° C. and was kept being stirred.

The exhaust gas was supplied for 40 minutes, and the resultant aqueous solution was sent to a decomposition step.

Gas Recovery Step:

A gas obtained as a result of bringing the exhaust gas into contact with the aqueous solution containing potassium carbonate in the gas absorption step was recovered. The gas contained carbon dioxide gas, nitrogen gas and oxygen gas in amounts of 20.3 volume %, 79.0 volume %, and 0.7 volume %, respectively, when the sum of the carbon dioxide gas, the nitrogen gas and the oxygen gas was 100 volume %. Further, the gas contained a slight amount of ammonia.

Contact with Water:

The gas obtained as a result of the gas recovery step was brought into contact with 2 L of water. The resultant gas contained no ammonia but contained carbon dioxide gas, nitrogen gas and oxygen gas in amounts of 20.3 volume %, 79.0 volume %, and 0.7 volume %, respectively.

Second Purification Step:

The gas obtained through the contact with water was supplied in an amount of 60,000 cm$^3$/hour to be brought into contact with an aqueous solution (temperature: 40° C.) containing potassium hydroxide in a concentration of 10 mass %.

After brought into contact with the aqueous solution, the gas contained carbon dioxide gas, nitrogen gas and oxygen gas in amounts of 0 volume %, 99.1 volume %, and 0.9 volume %, respectively, when the sum of the carbon dioxide gas, the nitrogen gas and the oxygen gas was 100 volume %. The results were the same as those in Example 1.

First Purification Step:

The gas obtained in the second purification step was supplied in an amount of 60,000 cm$^3$/hour to be mixed with hydrogen gas supplied in an amount of 4,200 cm$^3$/hour. They were brought into contact with each other in the presence of a platinum catalyzer at a temperature of 420° C. A gas obtained as a result of the first purification step contained carbon dioxide gas, nitrogen gas and oxygen gas in amounts of 0 volume %, 99.9 volume %, and 0.1 volume %, respectively, when the sum of the carbon dioxide gas, the nitrogen gas and the oxygen gas was 100 volume %. The results were the same as those in Example 1.

Decomposition Step:

The aqueous solution obtained in the gas absorption step was heated to 100° C. under ordinary pressure, while kept being stirred.

The thus-obtained aqueous solution proved to contain 10 mass % of potassium carbonate, 10 mass % of potassium bicarbonate, and 0.1 mass % of ammonia. Further, a gas obtained as a result of the decomposition step contained carbon dioxide gas, ammonia, nitrogen gas and oxygen gas in amounts of 95.8 volume %, 3.6 volume %, 0.5 volume %, and 0.1 volume %, respectively, when the sum of the carbon dioxide gas, the ammonia, the nitrogen gas and the oxygen gas was 100 volume %.

Circulation Step:

The aqueous solution containing potassium carbonate obtained in the decomposition step was circulated to the gas absorption step.

Carbon Dioxide Gas Recovery Step:

The gas obtained as a result of the decomposition step was brought into contact with water. The gas finally obtained contained carbon dioxide gas, nitrogen gas and oxygen gas in amounts of 99.4 volume %, 0.5 volume %, and 0.1 volume %, respectively, when the sum of the carbon dioxide gas, the nitrogen gas and the oxygen gas was 100 volume %. This gas contained moisture in an amount of 7.2 parts by mass per 100 parts by mass of the carbon dioxide gas. The results were the same as those in Example 1.

Example 5

Gas Absorption Step:

Exhaust gas was adjusted to have a composition such that carbon dioxide gas, nitrogen gas and oxygen gas were contained in amounts of 42.5 volume %, 57 volume %, and 0.5 volume %, respectively, when the sum of the carbon dioxide gas, the nitrogen gas and the oxygen gas was 100 volume %. The thus-prepared exhaust gas was supplied in an amount of 26,000 cm$^3$/hour to an aqueous solution containing sodium carbonate in a concentration of 14 mass %. At this time, the aqueous sodium carbonate solution had a temperature of 25° C. and was kept being stirred.

The exhaust gas was supplied for 70 minutes, and the resultant aqueous solution was sent to a decomposition step.

Gas Recovery Step:

A gas obtained as a result of bringing the exhaust gas into contact with the aqueous sodium carbonate solution in the gas absorption step was recovered. The gas contained carbon dioxide gas, nitrogen gas and oxygen gas in amounts of 31.6 volume %, 67.8 volume %, and 0.6 volume %, respectively, when the sum of the carbon dioxide gas, the nitrogen gas and the oxygen gas was 100 volume %.

Second Purification Step:

The gas obtained in the gas recovery step was supplied in an amount of 60,000 cm$^3$/hour to be brought into contact with an aqueous solution (temperature: 40° C.) containing potassium hydroxide in a concentration of 10 mass %.

After brought into contact with the aqueous solution, the gas contained carbon dioxide gas, nitrogen gas and oxygen gas in amounts of 0 volume %, 99.1 volume %, and 0.9 volume %, respectively, when the sum of the carbon dioxide gas, the nitrogen gas and the oxygen gas was 100 volume %. The results were the same as those in Example 1.

First Purification Step:

The gas obtained in the second purification step was supplied in an amount of 60,000 cm$^3$/hour to be mixed with hydrogen gas supplied in an amount of 4,200 cm$^3$/hour. They were brought into contact with each other in the presence of a platinum catalyzer at a temperature of 420° C. A gas obtained as a result of the first purification step contained carbon dioxide gas, nitrogen gas and oxygen gas in amounts of 0 volume %, 99.9 volume %, and 0.1 volume %, respectively, when the sum of the carbon dioxide gas, the nitrogen gas and the oxygen gas was 100 volume %. The results were the same as those in Example 1.

Decomposition Step:

The aqueous solution (in which a solid of apparently sodium bicarbonate was partially present) obtained in the gas absorption step was heated to 100° C. under ordinary pressure, while kept being stirred.

The thus-obtained aqueous solution proved to contain 9 mass % of sodium carbonate and 7 mass % of sodium bicarbonate. Further, a gas obtained as a result of the decomposition step contained carbon dioxide gas, nitrogen gas and oxygen gas in amounts of 99.4 volume %, 0.5 volume %, and 0.1 volume %, respectively, when the sum of the carbon dioxide gas, the nitrogen gas and the oxygen gas was 100 volume %. The results were the same as those in Example 1.

Circulation Step:

The aqueous solution containing sodium carbonate obtained in the decomposition step was circulated to the gas absorption step.

Carbon Dioxide Gas Recovery Step:

The gas obtained as a result of the decomposition step was brought into contact with water. The gas finally obtained contained carbon dioxide gas, nitrogen gas and oxygen gas in amounts of 99.4 volume %, 0.5 volume %, and 0.1 volume %, respectively, when the sum of the carbon dioxide gas, the nitrogen gas and the oxygen gas was 100 volume %. This gas contained moisture in an amount of 7.2 parts by mass per 100 parts by mass of the carbon dioxide gas. The results were the same as those in Example 1.

Example 6

Gas Absorption Step:

Exhaust gas was adjusted to have a composition such that carbon dioxide gas, nitrogen gas and oxygen gas were contained in amounts of 8.0 volume %, 91.5 volume %, and 0.5 volume %, respectively, when the sum of the carbon dioxide gas, the nitrogen gas and the oxygen gas was 100 volume %. The thus-prepared exhaust gas was supplied in an amount of 138,125 $cm^3$/hour to an aqueous solution containing potassium carbonate in a concentration of 17.5 mass %. At this time, the aqueous potassium carbonate solution had a temperature of 25° C. and was kept being stirred.

The exhaust gas was supplied for 125 minutes, and the resultant aqueous solution was sent to a decomposition step (first purification step).

Gas Recovery Step:

A gas obtained as a result of bringing the exhaust gas into contact with the aqueous potassium carbonate solution in the gas absorption step was recovered. The gas contained carbon dioxide gas, nitrogen gas and oxygen gas in amounts of 6.4 volume %, 93.1 volume %, and 0.5 volume %, respectively, when the sum of the carbon dioxide gas, the nitrogen gas and the oxygen gas was 100 volume %.

Second Purification Step:

The gas obtained in the gas recovery step was supplied in an amount of 60,000 $cm^3$/hour to be brought into contact with an aqueous solution (temperature: 40° C.) containing potassium hydroxide in a concentration of 10 mass %.

After brought into contact with the aqueous solution, the gas contained carbon dioxide gas, nitrogen gas and oxygen gas in amounts of 0 volume %, 99.1 volume %, and 0.9 volume %, respectively, when the sum of the carbon dioxide gas, the nitrogen gas and the oxygen gas was 100 volume %. The results were the same as those in Example 1.

First Purification Step:

The gas obtained in the second purification step was supplied in an amount of 60,000 $cm^3$/hour to be mixed with hydrogen gas supplied in an amount of 4,200 $cm^3$/hour. They were brought into contact with each other in the presence of a platinum catalyzer at a temperature of 420° C. A gas obtained as a result of the first purification step contained carbon dioxide gas, nitrogen gas and oxygen gas in amounts of 0 volume %, 99.9 volume %, and 0.1 volume %, respectively, when the sum of the carbon dioxide gas, the nitrogen gas and the oxygen gas was 100 volume %. The results were the same as those in Example 1.

Decomposition Step:

The aqueous solution obtained in the gas absorption step was heated to 100° C. under ordinary pressure, while kept being stirred.

The thus-obtained aqueous solution proved to contain 10 mass % of potassium carbonate and 10 mass % of potassium bicarbonate. Further, a gas obtained as a result of the decomposition step contained carbon dioxide gas, nitrogen gas and oxygen gas in amounts of 99.4 volume %, 0.5 volume %, and 0.1 volume %, respectively, when the sum of the carbon dioxide gas, the nitrogen gas and the oxygen gas was 100 volume %. The results were the same as those in Example 1.

Circulation Step:

The aqueous solution containing potassium carbonate obtained in the decomposition step was circulated to the gas absorption step.

Carbon Dioxide Gas Recovery Step:

The gas obtained as a result of the decomposition step was brought into contact with water. The gas finally obtained contained carbon dioxide gas, nitrogen gas and oxygen gas in amounts of 99.4 volume %, 0.5 volume %, and 0.1 volume %, respectively, when the sum of the carbon dioxide gas, the nitrogen gas and the oxygen gas was 100 volume %. This gas contained moisture in an amount of 7.2 parts by mass per 100 parts by mass of the carbon dioxide gas. The results were the same as those in Example 1.

Example 7

Gas Absorption Step:

Exhaust gas was adjusted to have a composition such that carbon dioxide gas, nitrogen gas and oxygen gas were contained in amounts of 42.5 volume %, 57 volume %, and 0.5 volume %, respectively, when the sum of the carbon dioxide gas, the nitrogen gas and the oxygen gas was 100 volume %. The thus-prepared exhaust gas was supplied in an amount of 26,000 $cm^3$/hour to an aqueous solution containing 17.5 mass % of potassium carbonate and 0.04 mass % of ammonia (0.019 mol of ammonia per mol of potassium carbonate). At this time, the aqueous solution had a temperature of 25° C. and was kept being stirred.

The exhaust gas was supplied for 45 minutes, and the resultant aqueous solution was sent to a decomposition step.

Gas Recovery Step:

A gas obtained as a result of bringing the exhaust gas into contact with the aqueous solution containing potassium carbonate in the gas absorption step was recovered. The gas contained carbon dioxide gas, nitrogen gas and oxygen gas in amounts of 23.5 volume %, 75.8 volume %, and 0.7 volume %, respectively, when the sum of the carbon dioxide gas, the nitrogen gas and the oxygen gas was 100 volume %. Further, the gas contained a slight amount of ammonia.

Contact with Water:

The gas obtained as a result of the gas recovery step was brought into contact with 2 L of water. The resultant gas contained no ammonia but contained carbon dioxide gas, nitrogen gas and oxygen gas in amounts of 23.5 volume %, 75.8 volume %, and 0.7 volume %, respectively.

Second Purification Step:

The gas obtained through the contact with water was supplied in an amount of 60,000 $cm^3$/hour to be brought into contact with an aqueous solution (temperature: 40° C.) containing potassium hydroxide in a concentration of 10 mass %.

After brought into contact with the aqueous solution, the gas contained carbon dioxide gas, nitrogen gas and oxygen gas in amounts of 0 volume %, 99.1 volume %, and 0.9 volume %, respectively, when the sum of the carbon dioxide gas, the nitrogen gas and the oxygen gas was 100 volume %. The results were the same as those in Example 1.

First Purification Step:

The gas obtained in the second purification step was supplied in an amount of 60,000 $cm^3$/hour to be mixed with hydrogen gas supplied in an amount of 4,200 $cm^3$/hour. They were brought into contact with each other in the presence of a platinum catalyzer at a temperature of 420° C. A gas obtained as a result of the first purification step contained carbon dioxide gas, nitrogen gas and oxygen gas in amounts of 0 volume %, 99.9 volume %, and 0.1 volume %, respectively, when the sum of the carbon dioxide gas, the nitrogen gas and the oxygen gas was 100 volume %. The results were the same as those in Example 1.

Decomposition Step:

The aqueous solution obtained in the gas absorption step was heated to 100° C. under ordinary pressure, while kept being stirred.

The thus-obtained aqueous solution proved to contain 10 mass % of potassium carbonate, 10 mass % of potassium bicarbonate, and 0.02 mass % of ammonia. Further, a gas obtained as a result of the decomposition step contained carbon dioxide gas, ammonia, nitrogen gas and oxygen gas in amounts of 98.4 volume %, 1.0 volume %, 0.5 volume %, and 0.1 volume %, respectively, when the sum of the carbon dioxide gas, the ammonia, the nitrogen gas and the oxygen gas was 100 volume %.

Circulation Step:

The aqueous solution containing potassium carbonate obtained in the decomposition step was circulated to the gas absorption step.

Carbon Dioxide Gas Recovery Step:

The gas obtained as a result of the decomposition step was brought into contact with water. The gas finally obtained contained carbon dioxide gas, nitrogen gas and oxygen gas in amounts of 99.4 volume %, 0.5 volume %, and 0.1 volume %, respectively, when the sum of the carbon dioxide gas, the nitrogen gas and the oxygen gas was 100 volume %. This gas contained moisture in an amount of 7.2 parts by mass per 100 parts by mass of the carbon dioxide gas. The results were the same as those in Example 1.

Example 8

Gas Absorption Step:

Exhaust gas was adjusted to have a composition such that carbon dioxide gas, nitrogen gas and oxygen gas were contained in amounts of 42.5 volume %, 57 volume %, and 0.5 volume %, respectively, when the sum of the carbon dioxide gas, the nitrogen gas and the oxygen gas was 100 volume %. The thus-prepared exhaust gas was supplied in an amount of 26,000 cm$^3$/hour to an aqueous solution containing 17.5 mass % of potassium carbonate and 0.4 mass % of ammonia (0.185 mol of ammonia per mol of potassium carbonate). At this time, the aqueous solution had a temperature of 25° C. and was kept being stirred.

The exhaust gas was supplied for 35 minutes, and the resultant aqueous solution was sent to a decomposition step.

Gas Recovery Step:

A gas obtained as a result of bringing the exhaust gas into contact with the aqueous solution containing potassium carbonate in the gas absorption step was recovered. The gas contained carbon dioxide gas, nitrogen gas and oxygen gas in amounts of 15.6 volume %, 83.7 volume %, and 0.7 volume %, respectively, when the sum of the carbon dioxide gas, the nitrogen gas and the oxygen gas was 100 volume %. Further, the gas contained a slight amount of ammonia.

Contact with Water:

The gas obtained as a result of the gas recovery step was brought into contact with 2 L of water. The resultant gas contained no ammonia but contained carbon dioxide gas, nitrogen gas and oxygen gas in amounts of 15.6 volume %, 83.7 volume %, and 0.7 volume %, respectively.

Second Purification Step:

The gas obtained through the contact with water was supplied in an amount of 60,000 cm$^3$/hour to be brought into contact with an aqueous solution (temperature: 40° C.) containing potassium hydroxide in a concentration of 10 mass %.

After brought into contact with the aqueous solution, the gas contained carbon dioxide gas, nitrogen gas and oxygen gas in amounts of 0 volume %, 99.1 volume %, and 0.9 volume %, respectively, when the sum of the carbon dioxide gas, the nitrogen gas and the oxygen gas was 100 volume %. The results were the same as those in Example 1.

First Purification Step:

The gas obtained in the second purification step was supplied in an amount of 60,000 cm$^3$/hour to be mixed with hydrogen gas supplied in an amount of 4,200 cm$^3$/hour. They were brought into contact with each other in the presence of a platinum catalyzer at a temperature of 420° C. A gas obtained as a result of the first purification step contained carbon dioxide gas, nitrogen gas and oxygen gas in amounts of 0 volume %, 99.9 volume %, and 0.1 volume %, respectively, when the sum of the carbon dioxide gas, the nitrogen gas and the oxygen gas was 100 volume %. The results were the same as those in Example 1.

Decomposition Step:

The aqueous solution obtained in the gas absorption step was heated to 100° C. under ordinary pressure, while kept being stirred.

The thus-obtained aqueous solution proved to contain 10 mass % of potassium carbonate, 10 mass % of potassium bicarbonate, and 0.2 mass % of ammonia. Further, a gas obtained as a result of the decomposition step contained carbon dioxide gas, ammonia, nitrogen gas and oxygen gas in amounts of 90.4 volume %, 9.0 volume %, 0.5 volume %, and 0.1 volume %, respectively, when the sum of the carbon dioxide gas, the ammonia, the nitrogen gas and the oxygen gas was 100 volume %.

Circulation Step:

The aqueous solution containing potassium carbonate obtained in the decomposition step was circulated to the gas absorption step.

Carbon Dioxide Gas Recovery Step:

The gas obtained as a result of the decomposition step was brought into contact with water. The gas finally obtained contained carbon dioxide gas, nitrogen gas and oxygen gas in amounts of 99.4 volume %, 0.5 volume %, and 0.1 volume %, respectively, when the sum of the carbon dioxide gas, the nitrogen gas and the oxygen gas was 100 volume %. This gas contained moisture in an amount of 7.2 parts by mass per 100 parts by mass of the carbon dioxide gas. The results were the same as those in Example 1.

Example 9

Gas Absorption Step:

Exhaust gas was adjusted to have a composition such that carbon dioxide gas, nitrogen gas and oxygen gas were contained in amounts of 42.5 volume %, 57 volume %, and 0.5 volume %, respectively, when the sum of the carbon dioxide gas, the nitrogen gas and the oxygen gas was 100 volume %. The thus-prepared exhaust gas was supplied in an amount of 26,000 cm$^3$/hour to an aqueous solution containing 17.5 mass % of potassium carbonate and 2.0 mass % of ammonia (0.927 mol of ammonia per mol of potassium carbonate). At this time, the aqueous solution had a temperature of 25° C. and was kept being stirred.

The exhaust gas was supplied for 30 minutes, and the resultant aqueous solution was sent to a decomposition step.

Gas Recovery Step:

A gas obtained as a result of bringing the exhaust gas into contact with the aqueous solution containing potassium carbonate in the gas absorption step was recovered. The gas contained carbon dioxide gas, nitrogen gas and oxygen gas in amounts of 8.5 volume %, 90.7 volume %, and 0.8 volume %, respectively, when the sum of the carbon dioxide gas, the nitrogen gas and the oxygen gas was 100 volume %. Further, the gas contained a slight amount of ammonia.

Contact with Water:

The gas obtained as a result of the gas recovery step was brought into contact with 2 L of water. The resultant gas contained no ammonia but contained carbon dioxide gas, nitrogen gas and oxygen gas in amounts of 8.5 volume %, 90.7 volume %, and 0.8 volume %, respectively.

Second Purification Step:

The gas obtained through the contact with water was supplied in an amount of 60,000 cm$^3$/hour to be brought into contact with an aqueous solution (temperature: 40° C.) containing potassium hydroxide in a concentration of 10 mass %.

After brought into contact with the aqueous solution, the gas contained carbon dioxide gas, nitrogen gas and oxygen gas in amounts of 0 volume %, 99.1 volume %, and 0.9 volume %, respectively, when the sum of the carbon dioxide gas, the nitrogen gas and the oxygen gas was 100 volume %. The results were the same as those in Example 1.

First Purification Step:

The gas obtained in the second purification step was supplied in an amount of 60,000 cm$^3$/hour to be mixed with hydrogen gas supplied in an amount of 4,200 cm$^3$/hour. They were brought into contact with each other in the presence of a platinum catalyzer at a temperature of 420° C. A gas obtained as a result of the first purification step contained carbon dioxide gas, nitrogen gas and oxygen gas in amounts of 0 volume %, 99.9 volume %, and 0.1 volume %, respectively, when the sum of the carbon dioxide gas, the nitrogen gas and the oxygen gas was 100 volume %. The results were the same as those in Example 1.

Decomposition Step:

The aqueous solution obtained in the gas absorption step was heated to 100° C. under ordinary pressure, while kept being stirred.

The thus-obtained aqueous solution proved to contain 10 mass % of potassium carbonate, 10 mass % of potassium bicarbonate, and 1.0 mass % of ammonia. Further, a gas obtained as a result of the decomposition step contained carbon dioxide gas, ammonia, nitrogen gas and oxygen gas in amounts of 66.4 volume %, 33.2 volume %, 0.3 volume %, and 0.1 volume %, respectively, when the sum of the carbon dioxide gas, the ammonia, the nitrogen gas and the oxygen gas was 100 volume %.

Circulation Step:

The aqueous solution containing potassium carbonate obtained in the decomposition step was circulated to the gas absorption step.

Carbon Dioxide Gas Recovery Step:

The gas obtained as a result of the decomposition step was brought into contact with water. The gas finally obtained contained carbon dioxide gas, nitrogen gas and oxygen gas in amounts of 99.4 volume %, 0.5 volume %, and 0.1 volume %, respectively, when the sum of the carbon dioxide gas, the nitrogen gas and the oxygen gas was 100 volume %. This gas contained moisture in an amount of 7.2 parts by mass per 100 parts by mass of the carbon dioxide gas. The results were the same as those in Example 1.

Table 1 shows the results of Examples 2, 4 and 7 to 9 to describe the effects of blending ammonia.

TABLE 1

|  | Gas absorption step Ammonia concentration of aqueous solution (mass %) | Gas absorption step Absorption time (min.) | Gas recovery step Carbon dioxide gas concentration (volume %) | Decomposition step Ammonia concentration of gas (volume %) |
|---|---|---|---|---|
| Example 2 | 0 | 50 | 26 | 0 |
| Example 4 | 0.2 | 40 | 20.3 | 3.6 |
| Example 7 | 0.04 | 45 | 23.5 | 1.0 |
| Example 8 | 0.4 | 35 | 15.6 | 9.0 |
| Example 9 | 2.0 | 30 | 8.5 | 33.2 |

The invention claimed is:

1. A method for separating exhaust gas containing carbon dioxide gas, nitrogen gas and oxygen gas into the carbon dioxide gas and a gas containing the nitrogen gas and the oxygen gas and respectively recovering the carbon dioxide gas and the gas containing the nitrogen gas and the oxygen gas, comprising:
    a gas absorption step of bringing the exhaust gas into contact with an aqueous solution containing alkaline carbonate, so that the carbon dioxide gas in the exhaust gas is allowed to react therewith, thereby obtaining an aqueous solution containing alkaline bicarbonate;
    a gas recovery step of recovering the gas containing the nitrogen gas and the oxygen gas obtained as a result of the gas absorption step;
    a decomposition step of decomposing at least a part of the alkaline bicarbonate obtained in the gas absorption step into the alkaline carbonate and the carbon dioxide gas;
    a circulation step of circulating at least a part of the alkaline carbonate obtained in the decomposition step to the gas absorption step; and
    a carbon dioxide gas recovery step of bringing gas containing the carbon dioxide gas obtained as a result of the decomposition step into contact with an aqueous solution, thereby recovering the carbon dioxide gas obtained in the decomposition step; and,
    further comprising a first purification step of allowing the gas containing the nitrogen gas and the oxygen gas obtained in the gas recovery step to react with hydrogen gas in the presence of a platinum catalyzer, thereby reducing the oxygen gas contained in the gas, wherein heat generated in the first purification step is used to decomp se at least a part of the alkaline bicarbonate into the alkaline carbonate and the carbon dioxide gas in the decomposition step.

2. The method according to claim 1, wherein the alkaline carbonate is potassium carbonate, and the alkaline bicarbonate is potassium bicarbonate.

3. The method according to claim 2, wherein the aqueous solution containing the alkaline carbonate in the gas absorption step further contains amines.

4. The method according to claim 2 further comprising a step of recognizing a composition of the exhaust gas before being subjected to the gas absorption step.

5. The method according to claim 2, wherein the exhaust gas has a volume ratio of the nitrogen gas to the oxygen gas (nitrogen gas/oxygen gas) of not less than 10/1 and not more than 100/1.

6. The method according to claim 1, wherein the aqueous solution containing the alkaline carbonate in the gas absorption step further contains amines.

7. The method according to claim 6, wherein the amines are ammonia.

8. The method according to claim 7 further comprising a step of recognizing a composition of the exhaust gas before being subjected to the gas absorption step.

9. The method according to claim 7, wherein the exhaust gas has a volume ratio of the nitrogen gas to the oxygen gas (nitrogen gas/oxygen gas) of not less than 10/1 and not more than 100/1.

10. The method according to claim 6 further comprising a step of recognizing a composition of the exhaust gas before being subjected to the gas absorption step.

11. The method according to claim 6, wherein the exhaust gas has a volume ratio of the nitrogen gas to the oxygen gas (nitrogen gas/oxygen gas) of not less than 10/1 and not more than 100/1.

12. The method according to claim 1 further comprising a step of recognizing a composition of the exhaust gas before being subjected to the gas absorption step.

13. The method according to claim 12, wherein the exhaust gas has a volume ratio of the nitrogen gas to the oxygen gas (nitrogen gas/oxygen gas) of not less than 10/1 and not more than 100/1.

14. The method according to claim 1, wherein the exhaust gas has a volume ratio of the nitrogen gas to the oxygen gas (nitrogen gas/oxygen gas) of not less than 10/1 and not more than 100/1.

15. The method according to claim 1 further comprising a second purification step of bringing the gas containing the nitrogen gas and the oxygen gas before being subjected to the first purification step or the gas containing the nitrogen gas and the oxygen gas after being subjected to the first purification step into contact with an aqueous alkali solution.

* * * * *